(12) United States Patent
Esaka et al.

(10) Patent No.: US 11,982,336 B2
(45) Date of Patent: May 14, 2024

(54) FRICTION TRANSMISSION BELT

(71) Applicant: Mitsuboshi Belting Ltd., Kobe (JP)

(72) Inventors: Mayu Esaka, Hyogo (JP); Yusuke Hemmi, Hyogo (JP); Eyobashenafi Tessema, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 153 days.

(21) Appl. No.: 17/763,929

(22) PCT Filed: Sep. 25, 2020

(86) PCT No.: PCT/JP2020/036442
§ 371 (c)(1),
(2) Date: Mar. 25, 2022

(87) PCT Pub. No.: WO2021/060536
PCT Pub. Date: Apr. 1, 2021

(65) Prior Publication Data
US 2022/0325777 A1 Oct. 13, 2022

(30) Foreign Application Priority Data

Sep. 25, 2019 (JP) ................. 2019-174610
Sep. 14, 2020 (JP) ................. 2020-154074

(51) Int. Cl.
*F16G 5/08* (2006.01)
*F16G 5/20* (2006.01)

(52) U.S. Cl.
CPC .................... *F16G 5/08* (2013.01); *F16G 5/20* (2013.01)

(58) Field of Classification Search
CPC .................................. F16G 5/08; F16G 5/20
USPC ............................................ 474/237
See application file for complete search history.

(56) References Cited

U.S. PATENT DOCUMENTS

| 2003/0050143 A1 | 3/2003 | Gregg et al. |
| 2005/0202916 A1 | 9/2005 | Wu |
| 2007/0155566 A1 | 7/2007 | Wu |
| 2013/0150488 A1* | 6/2013 | Feng ............ F16G 5/06 524/9 |

(Continued)

FOREIGN PATENT DOCUMENTS

| CN | 1938460 A | 3/2007 |
| CN | 107002818 A | 8/2017 |

(Continued)

OTHER PUBLICATIONS

Nov. 10, 2020—International Search Report—Intl App PCT/JP2020/036442.

(Continued)

*Primary Examiner* — Gene O Crawford
*Assistant Examiner* — Emily R Kincaid
(74) *Attorney, Agent, or Firm* — Banner & Witcoff, Ltd.

(57) ABSTRACT

A frictional power transmission belt includes a compression rubber layer that includes a frictional power transmission surface at least a part of which can come into contact with a pulley and that is formed of a cured product of a rubber composition. On a surface of the frictional power transmission surface, a surface layer comprising a cured product of a rubber composition containing a polyvinyl pyrrolidone-based resin and an elastomer component is laminated.

8 Claims, 4 Drawing Sheets

(56) References Cited

U.S. PATENT DOCUMENTS

| | | | | |
|---|---|---|---|---|
| 2015/0315372 A1* | 11/2015 | Feng | ................. | C08L 23/16 |
| | | | | 524/13 |
| 2017/0314641 A1* | 11/2017 | Kamba | ................. | F16G 1/28 |
| 2018/0244906 A1* | 8/2018 | Feng | ................. | C08L 23/16 |

FOREIGN PATENT DOCUMENTS

| | | | |
|---|---|---|---|
| CN | 107835838 | A | 3/2018 |
| EP | 0170201 | A1 | 2/1986 |
| JP | 2011-190916 | A | 9/2011 |
| JP | 2016-121806 | A | 7/2016 |
| JP | 2016-210822 | A | 12/2016 |
| JP | 2017-150662 | A | 8/2017 |
| JP | 2017150662 | A * | 8/2017 |
| JP | 2018-527430 | A | 9/2018 |
| WO | 2017-011265 | A1 | 1/2017 |

OTHER PUBLICATIONS

Oct. 11, 2023—(EP) Extended Search Report—App 20869575.9.
Jan. 23, 2024—(CN) Notification of First Office Action—App 202080066314.5.

* cited by examiner

FRICTION TRANSMISSION BELT

CROSS REFERENCE TO RELATED APPLICATIONS

This is a U.S. National Phase Application under 35 U.S.C. § 371 of International Application No. PCT/JP2020/036442, filed Sep. 25, 2020, which claims priority to Japanese Application Nos. 2019-174610, filed Sep. 25, 2019, and 2020-154074, filed Sep. 14, 2020, which were published Under PCT Article 21(2), the entire contents of which are incorporated herein by reference.

TECHNICAL FIELD

The present invention relates to a frictional power transmission belt (in particular, a V-ribbed belt) used for driving auxiliary equipment of an automobile engine and the like, and more particularly, to a frictional power transmission belt that can stabilize a frictional state of a frictional power transmission surface and improve noise suppression while maintaining transmission performance and fuel saving performance.

BACKGROUND ART

In the rubber industry field, in particular, an automobile component is desired to have high functionality and high performance. A frictional power transmission belt is one of rubber products used in such automobile component, and the frictional power transmission belt is widely used for power transmission for driving auxiliary equipment of automobiles such as an air compressor and an alternator, for example. As a belt of this type, a V-ribbed belt is known in which ribs are provided along a longitudinal direction of the belt, and the V-ribbed belt is required to have noise suppression in addition to belt performance such as transmission performance and fuel saving performance.

As for the noise suppression in an auxiliary equipment driving system of an automobile engine or the like, it is a problem to reduce a friction coefficient of a belt surface (i.e., pulley engagement surface) in contact with a pulley to improve noise easily generated when misalignment (imperfect alignment) occurs in the pulley or noise caused by a stick-slip phenomenon.

The stick-slip phenomenon means self-excited vibration generated between frictional surfaces due to repeated microscopic sticking or slipping of the frictional surfaces to each other. The stick-slip phenomenon occurs in a case where the friction coefficient is decreased with increase of the slip velocity or a case where discontinuous reduction of friction occurs when the friction changes from static friction to dynamic friction. Also in the frictional power transmission belt, when the friction coefficient between a pulley and a power transmission surface rubbing thereon is high (in particular, adhesiveness is high), a stick-slip phenomenon (i.e., vibration) in which sticking and slipping are repeated occurs between the frictional surfaces of the belt and the pulley. As a result, abnormal noise (i.e., squeal noise) occurs in a stage changing from the sticking to the slipping.

Further, stick-slip noise generated during running when submerged is also a problem. In detail, when wettability of a frictional power transmission surface is so low that the state of water entering between a belt and a pulley is not uniform, the friction coefficient is high in a place the water has not entered (i.e., dry state) while the friction coefficient is extremely decreased locally in a place the water has entered (i.e., wet state). As a result, the frictional state becomes unstable to generate stick-slip noise.

So far, from the viewpoint of forming a surface layer for improving the noise suppression on a frictional power transmission surface, a belt that improves the noise suppression when submerged (reduces abnormal noise due to stick-slip) has been proposed.

Patent Literature 1 discloses a frictional power transmission belt in which a surface rubber layer containing a relatively large amount of plasticizer is formed on a surface of a compression rubber layer.

Patent Literature 2 discloses a frictional power transmission belt in which a surface layer formed of a rubber composition containing polyvinyl alcohol-based resin particles and a polymer component is laminated on a surface of a power transmission surface.

Further, Patent Literature 3 discloses a frictional power transmission belt in which a surface layer containing a hydrophilic resin such as a polyvinyl alcohol-based resin and a binder resin is coated on a frictional power transmission surface.

CITATION LIST

Patent Literature

Patent Literature 1: JP-A-2011-190916
Patent Literature 2: JP-A-2016-121806
Patent Literature 3: JP-A-2017-150662

SUMMARY OF INVENTION

Technical Problem

In Patent Literatures 1 to 3, the noise suppression when submerged can be improved when containing a noise suppression improver in the surface layer. Furthermore, when the noise suppression improver is contained only in the surface layer, transmission loss (torque loss) caused by energy loss (tan δ) due to internal heat generation can be prevented.

In the frictional power transmission belt in Patent Literature 1 in which the plasticizer is blended, the affinity between water and the rubber (ethylene-α-olefin elastomer) forming the frictional power transmission surface can be increased by the plasticizer that has oozed out to the frictional power transmission surface, the frictional state between the belt and the pulley can be stabilized, and the noise suppression when submerged can be improved (abnormal noise due to stick-slip can be reduced).

Furthermore, since the plasticizer lacks heat resistance, the plasticizer easily disappears from the frictional power transmission surface during running, and a persistent effect cannot be expected.

In addition, since the polyvinyl alcohol-based resin in Patent Literatures 2 and 3 has a large particle diameter, the crack resistance is decreased.

Accordingly, an object of the present invention is to provide a frictional power transmission belt that can improve the noise suppression while maintaining the transmission efficiency and the durability.

Solution to Problem

As a result of intensive studies to achieve the above object, the present inventors have found that in a frictional power transmission belt including a compression rubber layer that includes a frictional power transmission surface at least a part of which can come into contact with a pulley and that is formed of a cured product of a rubber composition, by laminating a surface layer including a cured product of a rubber composition containing a polyvinyl pyrrolidone-based resin and an elastomer component on a surface of the frictional power transmission surface, the noise suppression can be improved while maintaining transmission efficiency and durability, and have completed the present invention, and have completed the present invention.

That is, the frictional power transmission belt of the present invention is a frictional power transmission belt including a compression rubber layer that includes a frictional power transmission surface at least a part of which can come into contact with a pulley and that is formed of a cured product of a rubber composition. A surface layer including a cured product of a rubber composition containing a polyvinyl pyrrolidone-based resin and an elastomer component is laminated on a surface of a frictional power transmission surface. The surface layer may be formed of the cured product of the rubber composition containing the polyvinyl pyrrolidone-based resin and the elastomer component. The surface layer may further include a fabric. The elastomer component may contain an ethylene-α-olefin elastomer. The K value of the polyvinyl pyrrolidone-based resin may be 10 to 100. The proportion of the polyvinyl pyrrolidone-based resin may be 1 to 20 parts by mass with respect to 100 parts by mass of the elastomer component. The rubber composition for forming the surface layer preferably does not contain a binder resin. The rubber composition for forming the compression rubber layer may not contain a polyvinyl pyrrolidone-based resin. The frictional power transmission belt may be a V-ribbed belt or a raw edge V-belt.

Advantageous Effects of Invention

In the present invention, in the frictional power transmission belt including a compression rubber layer that includes a frictional power transmission surface at least a part of which can come into contact with a pulley and that is formed of a cured product of a rubber composition, since a surface layer including a cured product of a rubber composition containing a polyvinyl pyrrolidone-based resin and an elastomer component is laminated on a surface of a frictional power transmission surface, it is possible to improve noise suppression while maintaining belt performance of the frictional power transmission belt such as transmission efficiency and durability.

DESCRIPTION OF EMBODIMENTS

[Surface Layer]

Figure 1:
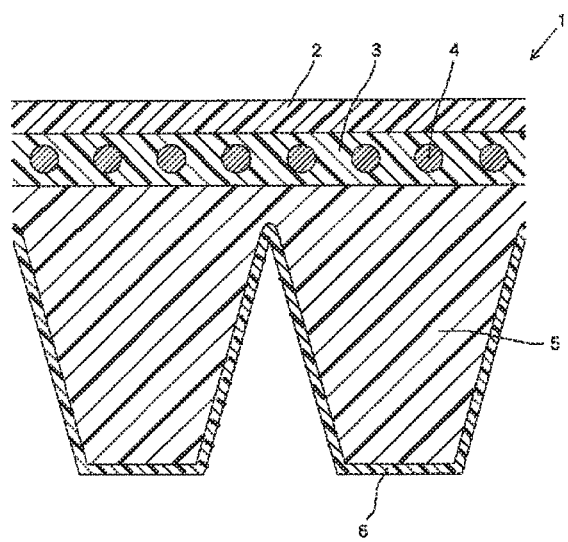
FIG. 1 is a schematic sectional view showing an example of a frictional power transmission belt of the present invention.

A frictional power transmission belt of the present invention includes a compression rubber layer which includes a frictional power transmission surface at least a part of which can come into contact with a pulley. A surface layer including a cured product of a rubber composition containing a polyvinyl pyrrolidone-based resin and an elastomer component is laminated on a surface of the frictional power transmission surface. The frictional power transmission surface comes into contact with the pulley via the surface layer. When the surface layer contains a combination of the polypyrrolidone-based resin and the elastomer component, the above-described effects are achieved. Although the details of the mechanism by which the effect is exhibited are not clear, it can be estimated as follows when the analysis is performed later.

First, when water enters between a belt and a pulley, the noise when submerged occurs due to the fact that, in a contact surface with the pulley, a friction coefficient remains high in a place the water has not entered (i.e., dry state) while the friction coefficient is extremely decreased locally in a place the water has entered (i.e., wet state), that is, the dry state and the wet state are mixed at the contact surface with the pulley. In this phenomenon, in related art, measurement of a relationship (μ-V characteristic) between a slip speed (V) and a friction coefficient (μ) in submerged running is used as an index, and a stick-slip noise occurs when the friction coefficient is decreased as the slip speed is increased.

Therefore, for the noise suppression, a person skilled in the art employs a method of improving the wettability by increasing the hydrophilicity of an entire contact surface with the pulley (bringing the entire contact surface into a wet state) for the purpose of bringing the contact surface with the pulley into a state in which a dry state and a wet state are not mixed even when submerged. The object is to stabilize a frictional state of the surface by bringing the entire contact surface into the wet state, and to prevent the friction coefficient from decreasing even when the slip speed is increased in the μ-V characteristic (slope of a friction coefficient-slip speed curve, and a change in a friction coefficient μ with respect to a slip speed V when submerged), thereby suppressing noise. A noise suppression improver (plasticizer, surfactant, water-soluble polymer, etc.) of related art is a formulation for reducing a change in the friction coefficient μ with respect to a change in the sliding speed by increasing the hydrophilicity of the entire contact surface with the pulley to improve the wettability (bringing the entire contact surface into the wet state) on the basis of such a concept.

For example, in the case of a liquid plasticizer, the plasticizer bleeds and presents from the inside of the rubber layer to the contact surface with the pulley. When submerged, a uniform water film is formed over the entire contact surface, which prevents the decrease in the friction coefficient μ even when the sliding speed is increased, thereby improving the noise suppression. However, this state has the following disadvantages (1) to (3).

(1) As the friction coefficient μ itself is decreased, a grip force is decreased, and the transmission performance is decreased (slip loss is increased)

(2) Because of the liquid state, the sustainability of the function on the contact surface is limited due to the influence of the supply and the dissipation to the contact surface (3) Addition of a plasticizer or surfactant causes a decrease in physical properties (elastic modulus) of rubber and an increase in internal heat generation (increase in torque loss).

On the other hand, in the case of a solid water-soluble polymer, the water-soluble polymer is present on the contact surface as particles, and a uniform water film is formed when the water-soluble polymer is submerged with water and dissolved little by little. For this reason, the above-described disadvantage of the plasticizer does not occur.

However, among solid water-soluble polymers, a polyvinyl alcohol (PVA)-based resin has a disadvantage that, due to the large particle size thereof, an eluted PVA portion can become a recess and cause defects or cracks from an interface between the rubber layer and the PVA particles when used over a long period of time.

On the other hand, since a polyvinyl pyrrolidone (PVP)-based resin has a smaller particle size than PVA, the crack resistance can be further improved. Therefore, in the present invention, by using the PVP-based resin, the above-described effects, that is, the following effects (1) to (5) can be exhibited.

(1) Noise suppression when submerged (friction coefficient is less likely to decrease even when sliding speed is increased)

(2) Sustainability of noise suppression effect (effect is maintained for a long period of time)

(3) High grip property, that is, high transmission performance can be maintained (slip loss is small)

(4) No decrease in physical properties (elastic modulus) of rubber and no increase in internal heat generation (increase in torque loss)

(5) Crack resistance is excellent and a long durability life is provided.

The surface layer may be laminated on the frictional power transmission surface that can come into contact with the pulley, but may be laminated on the entire surface (the entire exposed surface) of the compression rubber layer from the viewpoint of productivity and the like.

(Elastomer Component)

The rubber composition (curable rubber composition) for forming the surface layer contains an elastomer component. As the elastomer component, a vulcanizable or crosslinkable rubber may be used. Examples thereof include diene rubbers [natural rubber, isoprene rubber, butadiene rubber, chloroprene rubber, styrene butadiene rubber (SBR), acrylonitrile butadiene rubber (nitrile rubber), hydrogenated nitrile rubber, and the like], an ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. These elastomer components may be used alone or in combination of two or more. Among these, the ethylene-α-olefin elastomer is preferred from the viewpoint of excellent ozone resistance, heat resistance, cold resistance, and weather resistance, and reducing the belt weight.

The ethylene-α-olefin elastomer contains an ethylene unit or an α-olefin unit as a constituent unit, and may further contain a diene unit. Therefore, the ethylene-α-olefin elastomer includes ethylene-α-olefin copolymer rubber, ethylene-α-olefin-diene terpolymer rubber, and the like.

Examples of the α-olefin for forming the α-olefin unit include chain $\alpha\text{-}C_{3\text{-}12}$ olefins such as propylene, butene, pentene, methylpentene, hexene, and octene. Among these α-olefins, $\alpha\text{-}C_{3\text{-}4}$ olefins (in particular, propylene) such as propylene are preferred.

As the diene monomer for forming the diene unit, a non-conjugated diene monomer is generally used. Examples of the non-conjugated diene monomer include dicyclopentadiene, methylene norbornene, ethylidene norbornene, 1,4-hexadiene, and cyclooctadiene. Among these diene monomers, ethylidene norbornene and 1,4-hexadiene (in particular, ethylidene norbornene) are preferred.

Typical examples of the ethylene-α-olefin elastomer include an ethylene-propylene copolymer (EPM) and an ethylene-propylene-diene terpolymer (EPDM).

These ethylene-α-olefin elastomers can be used alone or in combination of two or more. Among these, the ethylene-α-olefin-diene terpolymer rubber is preferred, and the ethylene-propylene-diene copolymer (EPDM) is particularly preferred, from the viewpoint of excellent crosslinking efficiency by the diene unit.

In the ethylene-propylene-diene terpolymer, the proportion (mass ratio) of ethylene to propylene may be 35/65 to 90/10, preferably 40/60 to 80/20, more preferably 45/55 to 70/30, and most preferably 50/50 to 60/40.

The diene content of the ethylene-α-olefin elastomer (in particular, ethylene-α-olefin-diene terpolymer rubber such as EPDM) may be 10 mass % or less (e.g., 0.1 mass % to 10 mass %), preferably 7 mass % or less (e.g., 0.3 mass % to 7 mass %), more preferably 5 mass % or less (e.g., 0.5 mass % to 5 mass %), and most preferably 3 mass % or less (e.g., 1 mass % to 3 mass %). In the present invention, the heat resistance is improved by using an elastomer component having no double bond in a main chain, but high heat resistance can be ensured by adjusting the double bond due to the diene unit introduced as a side chain to a small amount. When the diene content is too large, the high heat resistance may not be ensured.

In the present application, the diene content means a mass ratio of the diene monomer unit in all units constituting the ethylene-α-olefin elastomer, and can be measured by a common method, but may be a monomer ratio.

The Mooney viscosity [ML(1+4)125° C.] of the unvulcanized ethylene-α-olefin elastomer may be 80 or less, and is, for example, 10 to 80, preferably 20 to 70, more preferably 30 to 50, and most preferably 35 to 45, from the viewpoint of adjusting Vm of the rubber composition and improving dispersibility of carbon black. When the Mooney viscosity is too high, the fluidity of the rubber composition may be decreased, and the processability in kneading may be decreased.

In the present application, the Mooney viscosity can be measured by a method according to JIS K6300-1 (2013), and the test conditions are a test temperature of 125° C., a preheating of 1 minute, and a rotor operation time of 4 minutes using an L-shaped rotor.

The proportion of the ethylene-α-olefin elastomer in the elastomer component is 50 mass % or more, preferably 80 mass % or more, more preferably 90 mass % or more, and most preferably 100 mass % (only the ethylene-α-olefin elastomer). When the proportion of the ethylene-α-olefin elastomer in the elastomer component is too small, the heat resistance and the cold resistance may be decreased.

(Polyvinyl Pyrrolidone-Based Resin)

The rubber composition further contains a polyvinyl pyrrolidone (PVP)-based resin in addition to the elastomer component.

The PVP-based resin contains an N-vinyl-2-pyrrolidone unit as a main constituent unit, and may further contain other copolymerizable units.

Examples of the monomer for forming the other copolymerizable units include olefins (e.g., α-$C_{2-10}$ olefins such as ethylene, propylene, 1-butene, isobutene, and 1-hexene), unsaturated carboxylic acids [e.g., (meth)acrylic acid $C_{1-6}$ alkyl esters such as (meth)acrylic acid, methyl(meth)acrylate, and ethyl(meth)acrylate, and (anhydrous)maleic acid], fatty acid vinyl esters (e.g., vinyl acetate, vinyl propionate, and vinyl crotonate), vinyl ethers (e.g., $C_{1-6}$ alkyl vinyl ethers such as methyl vinyl ether, ethyl vinyl ether, and propyl vinyl ether, and $C_{2-6}$ alkanediol vinyl ethers such as ethylene glycol vinyl ether, 1,3-propanediol vinyl ether, and 1,4-butanediol vinyl ether), and unsaturated sulfonic acids (e.g., ethylene sulfonic acid and allyl sulfonic acid). These monomers may be used alone or in combination of two or more. Among these, the unsaturated carboxylic acids such as (meth)acrylic acid and methyl(meth)acrylate, and the fatty acid vinyl esters such as vinyl acetate are preferred.

In the PVP-based resin, the proportion of the N-vinyl-2-pyrrolidone unit in the resin is, for example, 50 mass % or more (e.g., 70 mass % to 98 mass %), preferably 80 mass % or more (e.g., 80 mass % to 95 mass %), more preferably 90 mass % or more, and most preferably 100 mass %.

The PVP-based resin may be a common modified product or derivative. The form of the PVP-based resin may be linear or branched.

The K value of the PVP-based resin is not particularly limited, but is, for example, 10 to 100, preferably 15 to 99, more preferably 17 to 98, still more preferably 20 to 97, and most preferably 22.5 to 96, from the viewpoint of improving the durability and the noise suppression of the belt. When the K value is too small, the durability and the power transmission property of the belt may be decreased. On the contrary, when the K value is too large, the noise suppression may be decreased.

In the present application, the K value is a viscosity characteristic value correlated with a molecular weight, and can be calculated by applying a relative viscosity value (25° C.) measured by a capillary viscometer to the following Fikentscher formula.

$$K=(1.5 \log \eta_{rel}-1)/(0.15+0.003c)+[300c \log \eta_{rel}+(c+1.5c \log \eta_{rel})^2]^{1/2}/(0.15c+0.003c^2)$$

where $\eta_{rel}$ is the relative viscosity of an aqueous solution of the PVP-based resin with respect to water, and c is a concentration (mass %) of the PVP-based resin in the aqueous solution of the PVP-based resin.

The proportion of the PVP-based resin can be selected from the range of about 0.1 to 25 parts by mass with respect to 100 parts by mass of the elastomer component, and is, for example, 0.1 to 20 parts by mass, preferably 0.5 to 15 parts by mass, more preferably 1 to 10 parts by mass, still more preferably 2 to 8 parts by mass, and most preferably 3 to 7 parts by mass. In particular, from the viewpoint of achieving both the noise suppression and the belt performance such as high transmission efficiency, the proportion of the PVP-based resin is preferably 1 to 20 parts by mass, more preferably 2 to 15 parts by mass, and still more preferably 3 to 10 parts by mass with respect to 100 parts by mass of the elastomer component. When the proportion of the PVP-based resin is too small, the noise suppression when submerged may be decreased. On the contrary, when the proportion is too large, the mechanical strength of the surface layer may be decreased.

(Crosslinking Agent)

The rubber composition may further contain a commonly used crosslinking agent (or vulcanizing agent) in addition to the elastomer component and the PVP-based resin. When the elastomer component is an ethylene-α-olefin elastomer, the crosslinking agent may be an organic peroxide or a sulfur-based vulcanizing agent.

Examples of the organic peroxide include diacyl peroxide (dilauroyl peroxide, dibenzoyl peroxide, etc.), peroxyketal [1,1-di(t-butylperoxy)cyclohexane, 2,2-di(t-butylperoxy)butane, etc.], alkylperoxyester (t-butylperoxybenzoate, etc.), dialkyl peroxide [di-t-butylperoxide, dicumyl peroxide, t-butylcumyl peroxide, 2,5-dimethyl-2,5-di(t-butylperoxy)hexane, 2,5-dimethyl-2,5-di(t-butylperoxy)hexyne-3, 1,1-di(t-butylperoxy)-3,3,5-trimethylcyclohexane, 1,3-bis(2-t-butylperoxyisopropyl)benzene, 2,5-di-methyl-2,5-di(benzolyperoxy)hexane, etc.], peroxycarbonate (t-butylperoxyisopropyl carbonate, t-butylperoxy-2-ethylhexyl carbonate, t-amylperoxy-2-ethylhexyl carbonate, etc.). These organic peroxides may be used alone or in combination of two or more. Among these, the dialkyl peroxide such as 1,3-bis(2-t-butylperoxyisopropyl)benzene is preferred.

Examples of the sulfur-based vulcanizing agent include powdered sulfur, precipitated sulfur, colloidal sulfur, insoluble sulfur, highly dispersible sulfur, and sulfur chlorides (such as sulfur monochloride and sulfur dichloride).

These crosslinking agents may be used alone or in combination of two or more. Among these, the crosslinking agent containing an organic peroxide is preferred.

The proportion of the vulcanizing agent or crosslinking agent (in particular, organic peroxide) is, for example, 0.1 to 30 parts by mass, preferably 1 to 20 parts by mass, more preferably 3 to 10 parts by mass, and most preferably 4 to 6 parts by mass with respect to 100 parts by mass of the elastomer component.

(Reinforcing Agent)

The composition may further contain a reinforcing agent in addition to the elastomer component and the PVP-based resin. Examples of the reinforcing agent include carbon black, silica, clay, calcium carbonate, talc, mica, and short fibers. These reinforcing agents can be used alone or in combination of two or more. Among these, the carbon black and the silica are preferred, and the carbon black is particularly preferred.

The proportion of the reinforcing agent is, for example, 10 parts by mass to 200 parts by mass, preferably 20 parts by mass to 150 parts by mass, more preferably 30 parts by mass to 100 parts by mass, and most preferably 50 parts by mass to 80 parts by mass with respect to 100 parts by mass of the elastomer component.

(Other Components)

The rubber composition may further contain a commonly used additive used as a compounding agent for rubber. Examples of the common additive include a co-crosslinking agent (bismaleimides, etc.), a vulcanization aid or a vulcanization accelerator (thiuram accelerator, etc.), a vulcanization retarder, a metal oxide (zinc oxide, magnesium oxide, calcium oxide, barium oxide, iron oxide, copper oxide, titanium oxide, aluminum oxide, etc.), a softener (oils such as paraffin oil and naphthenic oil, etc.), a processing agent or a processing aid (stearic acid, metal stearate, wax, paraffin, fatly acid amide, etc.), a silane coupling agent, an anti-aging agent (antioxidant, heat age resister, bending crack inhibitor, ozone deterioration inhibitor, etc.), a colorant, a tackifier, a stabilizer (ultraviolet absorber, heat stabilizer, etc.), a flame retardant, and an antistatic agent. These additives may be used alone or in combination of two or more. The metal oxide may act as the crosslinking agent.

The total proportion of the common additives is, for example, 5 to 50 parts by mass, preferably 10 to 30 parts by mass, and more preferably 15 to 25 parts by mass with respect to 100 parts by mass of the elastomer component.

The rubber composition for forming the surface layer preferably substantially does not contain a binder resin, and particularly preferably does not contain a binder resin. The binder resin may be, for example, at least one thermoplastic resin selected from the group consisting of a polyolefin, a styrene-based resin, a polyester-based resin, a polycarbonate-based resin, a polyamide-based resin, and a polyurethane-based resin. In particular, the binder resin may be a polyolefin such as polyethylene or polypropylene.

(Structure of Surface Layer)

The surface layer may have a single structure formed of a cured product of the rubber composition (cured rubber composition) (homogeneous structure formed of the cured rubber composition alone), or may have a composite structure further including a fabric in addition to the cured rubber composition (composite structure including the cured rubber composition and the fabric). As the structure of the surface layer, the single structure is preferable in an application in which high transmission efficiency (fuel saving performance) is required, and the composite structure is preferable in an application in which high noise suppression is required.

(Surface Layer Having Composite Structure)

When the surface layer has the composite structure, the composite structure may be a two-layer structure including a rubber layer formed of the cured rubber composition and laminated on the compression rubber layer and a rubber fiber mixed layer laminated on the rubber layer and having the cured rubber composition penetrated into the fabric (outermost surface layer formed of a fabric and a rubber composition penetrated between fibers constituting the fabric). In the surface layer having such a two-layer structure, in the rubber fiber mixed layer on a surface side of the surface layer, the rubber composition permeates (infiltrates) into the structure of the fabric (between the fibers), and the fabric is firmly fixed or bonded between the fibers. Therefore, the rubber composition that has penetrated between the fibers of the fabric exhibits the effect of the combination of the polyvinyl pyrrolidone-based resin and the elastomer component, similarly to the surface layer having a single structure. Furthermore, in the surface layer having such a two-layer structure, not only the noise suppression but also the wear resistance of the fabric can be improved, and as a result, the effect (noise suppression) of the surface layer can be maintained over a long period of time. That is, it can be presumed that the rubber composition intrudes between the fibers of the fabric (knitted fabric or the like) to hold (or bond to) the fibers of the fabric to firmly fix or bond the fabric, and the fibers of the fabric (knitted fabric or the like) are prevented from falling off from the frictional power transmission surface to improve the wear resistance.

In the surface layer having the two-layer structure, from the viewpoint of improving the noise suppression, it is preferable that the rubber composition penetrates substantially uniformly into the structure of the fabric constituting the rubber fiber mixed layer, and the rubber composition does not substantially ooze out from the surface of the rubber fiber mixed layer, and it is particularly preferable that the rubber composition uniformly penetrates into the structure of the fabric constituting the rubber fiber mixed layer and the rubber composition does not ooze out from the surface of the rubber fiber mixed layer. That is, it is preferable that a layer formed of the cured rubber composition alone (a thin layer formed of the oozed out rubber composition) is not substantially formed on the surface of the rubber fiber mixed layer, and it is particularly preferable that the thin layer is not formed.

In the surface layer having the two-layer structure, the average thickness of the rubber fiber mixed layer is, for example, 0.25 to 4 times, preferably 0.5 to 2 times, more preferably 0.8 to 1.2 times the average thickness of the rubber layer.

(Fabric)

In the surface layer having the composite structure, as the fabric (fabric layer), a fiber member such as a woven material (woven fabric), a knitted material (knitted fabric), or a nonwoven fabric can be used, and a knitted fabric (or a canvas) is often used. The knitted fabric may be a knitted fabric formed of water absorbent fibers (or hydrophilic fibers) and non-water absorbent fibers (for example, a knitted fabric described in JP-A-2016-70494) because the knitted fabric can be formed of water-absorbent fibers and/or non-water-absorbent fibers and can improve the noise suppression when submerged.

Examples of the water-absorbent fibers or the hydrophilic fibers (or fibers containing water-absorbent yarns) include vinyl alcohol-based fibers (polyvinyl alcohol, ethylene-vinyl alcohol polymer fibers, vinylon, etc.), polyamide fibers (aliphatic polyamide fibers such as polyamide 6 fibers, polyamide 66 fibers, polyamide 46 fibers, etc.), cellulose-based fibers [cellulose fibers (cellulose fibers derived from plants such as cotton and hemp, animals or bacteria), fibers of cellulose derivatives such as rayon and acetate], and animal-derived fibers (wool, silk, etc.). These water-absorbent fibers may be used alone or in combination of two or more. Among these water-absorbent fibers, cellulose fibers (in particular, cotton fibers) are preferred.

The cellulose-based fibers may be spun yarns. The thickness (yarn count) of the cellulose-based fibers is, for example, about 5 to 100, preferably about 10 to 80, and more preferably about 20 to 70 (particularly, about 30 to 50). When the thickness is too small, the mechanical properties of the knitted fabric may be decreased, and when the thickness is too large, the water absorbency may be decreased. Preferred cellulose-based fibers are cellulose fibers.

Examples of the non-water-absorbent fibers include: synthetic fibers such as polyolefin fibers polyolefin fibers (polyethylene fibers (including high-strength polyethylene fibers), polypropylene fibers, etc.), non-absorbent polyamide fibers (aromatic polyamide fibers such as aramid fibers), acrylic fibers, polyester fibers [$C_{2-4}$ alkylene $C_{6-14}$ allylate fibers such as polyethylene terephthalate (PET) fibers, polypropylene terephthalate (PPT) fibers, polytrimethylene terephthalate (PTT) fibers, polybutylene terephthalate (PBT) fibers, and polyethylene naphthalate (PEN) fibers, and polyarylate fibers], polyparaphenylene benzobisoxazole (PBO) fibers, and polyurethane fibers; and inorganic fibers such as carbon fibers. These non-water-absorbent fibers may be used alone or in combination of two or more. Among these non-water-absorbent fibers, composite fibers (composite yarns), for example, composite fibers of synthetic fibers (composite yarns of synthetic fibers) may be used, and in order to improve the wear resistance of the knitted fabric and prevent the rubber from oozing out to the frictional power transmission surface (or the surface of the knitted fabric), bulky textured yarns or bulky composite yarns (such as polyester-based composite yarns such as PT/PET conjugate yarns) having a large cross-sectional bulk are preferred.

The fineness of the non-water-absorbent fibers may be, for example, about 20 dtex to 600 dtex, preferably about 50 dtex to 300 dtex, and more preferably about 60 dtex to 200 dtex (in particular, about 70 dtex to 100 dtex).

The fabric (knitted fabric or the like) preferably contains at least water-absorbent fibers (in particular, cellulose-based fibers). The proportion of the non-water-absorbent fibers may be selected from the range of, for example, 200 parts by mass or less (for example, 0 to 200 parts by mass) with respect to 100 parts by mass of the water-absorbent fibers, and may be, for example, about 1 to 100 parts by mass, preferably about 3 to 80 parts by mass (for example, 5 to 50 parts by mass), and more preferably about 10 to 40 parts by mass (particularly 20 to 30 parts by mass). When the proportion of the non-water-absorbent fibers is too large, the water absorbency of the knitted fabric may be decreased, and the noise suppression when submerged may be decreased.

The structure of the knitted fabric is not particularly limited, and a common structure can be used. A single layer weft knit [for example, a weft knit in which a flat knit (plain knit) is used as a knitted structure] or a multilayer knitted fabric [for example, a moss stitch knit (a weft knit in which a moss stitch knit is used as a knitted structure)] is preferred, and a multilayer knitted fabric is particularly preferred. In the multilayer knitted fabric, the number of layers of the knitted fabric may be, for example, 2 to 5, preferably 2 to 4, and more preferably 2 or 3.

The density of fibers or yarns of the knitted fabric may be, for example, 30 fibers or yarns/inch or more (for example, 32 to 70 fibers or yarns/inch, preferably 34 to 60 fibers or yarns/inch, and more preferably 35 to 55 fibers or yarns/inch) in each of a wale direction and a course direction. In addition, the total density of fibers and yarns may be 60 fibers/inch or more (for example, 62 to 120 fibers and yarns/inch, preferably 70 to 115 fibers and yarns/inch, more preferably 80 to 110 fibers and yarns/inch, and particularly preferably 90 to 105 fibers/inch).

The bulkiness range of the fabric or fiber member (for example, a knitted fabric in which a composite yarn such as a bulky textured yarn as a synthetic fiber is knitted) can be selected within a range in which oozing out of the rubber can be prevented, and may be, for example, about 2 to 4.5 cm$^3$/g (for example, 2.2 to 4 cm$^3$/g), preferably about 2.3 to 3.8 cm$^3$/g (for example, 2.4 to 3.5 cm$^3$/g), and more preferably about 2.5 to 3.3 cm$^3$/g. The bulkiness (cm$^3$/g) can be calculated by dividing the thickness (cm) of the knitted fabric by the mass per unit area (g/cm$^2$).

The fabric (knitted fabric, etc.) may have a basis weight of, for example, about 50 to 500 g/m$^2$, preferably about 80 to 400 g/m$^2$, and more preferably about 100 to 350 g/m$^2$.

The thickness (average thickness) of the fabric (knitted fabric, etc.) can be selected from the range of about 0.1 mm to 5 mm, and may be, for example, about 0.3 mm to 3 mm (e.g., 0.4 mm to 2 mm), and preferably about 0.5 mm to 1.5 mm (e.g., 0.7 mm to 1.2 mm).

In order to improve the adhesiveness to the functional power transmission surface, the fabric (knitted fabric, etc.) may be subjected to an adhesion treatment, if necessary. The adhesion treatment can also improve the wear resistance of the frictional power transmission surface (power transmission surface). Examples of the adhesion treatment include: a method of immersing the fabric in a treatment liquid obtained by dissolving an adhesive component (e.g., an epoxy compound or an isocyanate compound) in an organic solvent (toluene, xylene, methyl ethyl ketone, etc.) and then heating and drying the fabric; and a method of immersing the fabric in a resorcin-formalin-latex liquid (RFL treatment liquid) and then heating and drying the fabric. These methods can be performed alone or in combination, and the treatment order and the number of treatments are not limited. For example, the fabric may be pretreated with an epoxy compound and/or an isocyanate compound, immersed in an RFL treatment liquid, and then heat-dried.

(Isocyanate Compound)

When the fabric is treated (impregnated or adhered) with at least an isocyanate compound (polyisocyanate compound), the adhesiveness to the rubber composition and the wear resistance of the fabric are improved, and the noise suppression can be maintained for a long period of time. In particular, when the rubber component of the surface layer and/or the fiber (water-absorbent or hydrophilic fibers such as cellulose-based fibers) of the fabric has a functional group (for example, an organic group having an active hydrogen atom such as a hydroxy group, a carboxyl group, or an amino group) reactive with an isocyanate compound, by treating the fabric with the isocyanate compound, the mechanical properties of the fabric, the adhesiveness to the rubber component, and the wear resistance and the durability of the frictional power transmission belt can be further improved, and the noise suppression can be maintained for a long period of time. The fabric may be treated with an isocyanate compound in combination with a resorcin-formalin-latex liquid (RFL liquid) and/or an epoxy resin widely used as a fabric treatment agent, but the adhesiveness and mechanical properties can be improved without the treatment with the RFL liquid and/or the epoxy resin.

The isocyanate compound has a reactive isocyanate group, and generally, a polyisocyanate having a plurality of isocyanate groups in one molecule (for example, diisocyanate) is often used. Examples of the polyisocyanate include aliphatic polyisocyanates [diisocyanates such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI); triisocyanates or polyisocyanates such as 1,6,11-undecanetriisocyanatemethyloctane and 1,3,6-hexamethylene triisocyanate]: alicyclic polyisocyanates [diisocyanates such as cyclohexane 1,4-diisocyanate, isophorone diisocyanate (IPDI), hydrogenated xylylene diisocyanate, and hydrogenated bis(isocyanatophenyl)methane; triisocyanates or polyisocyanates such as bicycloheptane triisocyanate]; aromatic polyisocyanates [diisocyanates such as phenylene diisocyanate, tolylene diisocyanate (TDI), xylylene diisocyanate (XDI), tetramethylxylylene diisocyanate (TMXDI), naphthalene diisocyanate (NDI), bis(isocyanatophenyl)methane (MDI), toluidine diisocyanate (TODI), and 1,3-bis(isocyanatophenyl)propane; and triisocyanates or polyisocyanates].

These polyisocyanates may be derivatives such as multimers (dimers, trimers, tetramers, etc.), adducts, modified products (biuret modified products, alohanate modified products, urea modified products, etc.), or urethane oligomers having a plurality of isocyanate groups. Examples of the modified product or derivative of the polyisocyanate include: an adduct of a polyisocyanate (an aliphatic polyisocyanate such as hexamethylene diisocyanate) and a polyhydric alcohol (such as trimethylolpropane and pentaerythritol); a biuret of the polyisocyanate; and a multimer of the polyisocyanate (for example, an aliphatic polyisocyanate) (for example, a polyisocyanate having an isocyanurate ring such as a trimer of hexamethylene diisocyanate).

These isocyanate compounds can be used alone or in combination of two or more thereof. Among these isocyanate compounds (in particular, polyisocyanates), aliphatic polyisocyanates and derivatives thereof (e.g., HDI or trimers thereof), aromatic polyisocyanates (TDI, MDI, etc.), and the like are widely used.

Further, the isocyanate compound may be a general-purpose isocyanate compound having a free isocyanate group (isocyanate compound not protected by a blocking agent), but it is preferable to use a heat-reactive isocyanate compound (or blocked polyisocyanate) in which the isocyanate group is protected with a blocking agent. When a heat-reactive isocyanate compound is used, in the process of molding the belt, the isocyanate group is protected by the blocking agent and is thus inactive and does not participate in curing, so that the tension ability (moldability) of the fabric is not hindered; and in the process of vulcanizing the belt, the blocking agent is dissociated, the isocyanate group is activated and reacts with the reactive group of the fabric for curing, and the wear resistance can be improved. Therefore, when a heat-reactive isocyanate compound is used, the adhesiveness of the fabric and the wear resistance and the durability of the frictional power transmission belt can be improved without lowering the productivity of the belt, and the noise suppression when submerged can be maintained for a long period of time. Further, an aqueous immersion liquid containing an isocyanate compound is easy to prepare and has a small environmental load as compared with the RFL liquid.

As the heat-reactive isocyanate compound, a commonly used heat-reactive polyisocyanate can be used. Examples of the blocking agent (protective agent) include $C_{1-24}$ monoalcohols such as methanol, ethanol, and isopropanol, or alkylene oxide adducts thereof (for example, $C_{2-4}$ alkylene oxide adducts such as ethylene oxide); phenols such as phenol, cresol, and resorcin; oximes such as acetoxime, methylethylketoxime, and cyclohexaneoxime; lactams such as ε-caprolactam and valerolactam; and secondary amines such as dibutylamine and ethyleneimine. These blocking agents can be used alone or in combination of two or more thereof. Among these, oximes, lactams, or the like are widely used. The form of the heat-reactive isocyanate compound is not particularly limited and may be in the form of a liquid or powder, or may be in the form of containing an aqueous or organic solvent (aqueous solution or dispersion, or organic solvent solution).

The content of the isocyanate group of the isocyanate compound (heat-reactive isocyanate compound, etc.) is not particularly limited, and is, for example, about 1 mass % to 50 mass %, preferably about 3 mass % to 40 mass %, and more preferably about 5 mass % to 30 mass %.

A dissociation temperature (temperature at which the blocking agent dissociates and the active isocyanate group regenerates) of the heat-reactive isocyanate compound may be equal to or higher than a heating temperature in the belt molding step before the vulcanization step of the rubber component (generally equal to or higher than a drying temperature of the fabric impregnated with the liquid composition by immersion) and may be equal to or lower than a vulcanization temperature of the rubber component. When the dissociation temperature is high, the drying temperature can be raised, so that the productivity can be improved. The dissociation temperature may be, for example, 120° C. or higher (preferably 150° C. or higher, and more preferably 180° C. or higher), and may be, for example, about 120° C. to 250° C. (e.g., 150° C. to 240° C.), preferably about 160° C. to 230° C. (e.g., 170° C. to 220° C.), and more preferably about 175° C. to 210° C. (particularly 180° C. to 200° C.). When the dissociation temperature is too low, the drying temperature cannot be raised, and thus it takes time to dry, which may reduce the productivity.

The present form of the isocyanate compound may be any form in which at least a part of the fibers forming the fabric is coated or adhered. The distribution region of the isocyanate compound may be either the surface of the fabric or between the fibers inside the fabric. In order to improve the wear resistance, it is preferable that the isocyanate compound is distributed substantially uniformly (particularly uniformly) over the entire fabric including the fibers inside the fabric (entangled porous structure). By immersing the fabric in a liquid composition containing the isocyanate compound, the isocyanate compound can be easily and uniformly distributed over the entire fabric.

The proportion of the isocyanate compound may be about 1 mass % to 30 mass % in the fabric, and may be, for example, about 3 mass % to 20 mass %, preferably about 5 mass % to 18 mass % (for example, 7 mass % to 15 mass %), and more preferably about 10 mass % to 15 mass % (for example, 11 mass % to 13 mass %), from the viewpoints of maintaining the flexibility of the fabric, improving the adhesiveness and the wear resistance, and maintaining the noise suppression when submerged for a long period of time. When the proportion of the isocyanate compound is too small, the adhesiveness and the wear resistance are not improved so much, and the noise suppression when submerged may be lowered. On the contrary, when the proportion is too large, the flexibility of the fabric or the belt may be lowered.

The fabric (knitted fabric, etc.) may contain commonly used additives such as a surfactant, a dispersant, a filler, a colorant, a stabilizer, a surface treatment agent, and a leveling agent on the fiber surface or inside the fibers. These additives may be used alone or in combination of two or more. The proportion of the additives may be 10 mass % or less, for example, about 0.01 mass % to 5 mass %, preferably about 0.1 mass % to 3 mass %, and more preferably about 0.5 mass % to 2 mass % with respect to the entire fabric (knitted fabric, etc.). The treated amount (content) of the surfactant may be about 0.1 g to 200 g (for example, 1 g to 150 g), and preferably about 3 g to 100 g (for example, 5 g to 60 g) per 1 m² of the fabric.

(Properties of Surface Layer)

The rubber composition contained in the surface layer may be formed of a rubber composition whose Mooney scorch minimum viscosity Vm is adjusted to a range of 50 to 110 (a rubber composition in which Vm when measured at a temperature of 125° C. is adjusted to a predetermined range). Specifically. Vm can be selected from a range of 50 to 130 (for example, 55 to 120), for example, 57 to 115 (for example, 60 to 110), and preferably about 65 to 100. In particular, in the case where the surface layer has the composite structure, when the surface layer contains such a rubber composition, the rubber composition penetrates into the structure of the fabric (between the fibers) to the extent that the rubber composition does not completely permeate the fabric (does not ooze out from the surface), and the fabric is firmly fixed or bonded, whereby the effect (noise suppression) of the surface layer can be maintained over a long period of time. In addition, since the rubber composition that uniformly permeates into the structure of the fabric (between the fibers) and contains the polyvinyl pyrrolidone-based resin is disposed on the frictional power transmission surface, the noise suppression when submerged can be maintained.

In the case of the surface layer having the composite structure, when Vm of the rubber composition is too high, the fluidity of the rubber composition may be decreased, the permeability of the rubber composition into the fabric may be decreased, the effects described above may be decreased, and the formability of the surface layer may be decreased. When Vm is too low, since the fluidity of the rubber composition is high, the rubber composition easily permeates through the structure of the fabric (knitted fabric or the like) and oozes out from the frictional power transmission surface, and the noise suppression (noise due to adhesive wear of the oozed out rubber) may be decreased.

In the present application, the Mooney scorch minimum viscosity Vm can be measured in accordance with the Mooney scorch test of JIS K6300-1 (2013), and specifically, can be measured by a method described in Examples described later.

The cured product (crosslinked body) of the rubber composition has a low internal loss tangent (tan S) of, for example, 0.08 to 0.17, preferably 0.09 to 0.165, more preferably 0.1 to 0.16, still more preferably 0.11 to 0.15, and most preferably 0.12 to 0.15. When the tan δ is too high, the internal heat generation may be increased, and the energy loss (transmission loss) may be increased.

In the present application, the loss tangent (tan S) can be measured by a method described in Examples described later, and the loss tangent in a direction (reverse grain direction) perpendicular to a rolling direction is measured. In addition, in a cured product in which short fibers are arranged in a predetermined direction, the loss tangent in a direction (reverse grain direction) perpendicular to the arrangement direction (grain direction) of the short fibers is measured.

The thickness (average thickness) of the surface layer having the single structure is, for example, about 100 to 1500 μm, preferably about 150 to 800 μm, and more preferably about 200 to 600 μm. The thickness (average thickness) of the surface layer having the single structure can be selected from a range of about 1% to 50% with respect to the average thickness (average thickness at an apex of a rib portion) of the entire compression rubber layer, and is, for example, about 2% to 40%, preferably about 3% to 35% (for example, about 4% to 30%), and more preferably about 5% to 25% (particularly about 10% to 20%). When the thickness of the surface layer is too small, the effect of improving the noise suppression may be decreased, and the durability of the noise suppression may also be decreased. On the other hand, when the thickness of the surface layer is too large, the mechanical properties of the compression rubber layer may be decreased.

The thickness (average thickness) of the surface layer having a composite structure is, for example, about 150 μm to 1500 μm, preferably about 200 μm to 1000 μm, and more preferably about 300 μm to 700 μm. The thickness (average thickness) of the surface layer having a composite structure can be selected from a range of about 1% to 50% with respect to the average thickness (average thickness at the apex of the rib portion) of the entire compression rubber layer, and is, for example, about 5% to 45%, preferably about 10% to 40% (e.g., 15% to 35%), and more preferably about 20% to 30% (particularly about 22% to 28%). When the thickness of the surface layer is too small, the effect of improving the noise suppression may be decreased, and the durability of the noise suppression may also be decreased. On the other hand, when the thickness of the surface layer is too large, the mechanical properties of the compression rubber layer may be decreased.

In the present application, the average thickness of the surface layer is determined by observing and measuring a cross section of a compression rubber layer portion of the frictional power transmission belt using a scanning electron microscope, and calculating an average value of 10 points of the surface layer containing the PVP-based resin.

[Compression Rubber Layer]

The compression rubber layer is formed of a rubber composition containing an elastomer component. As the elastomer component, the elastomer component exemplified in the section of the surface layer can be used, and the preferable elastomer component is the same as that of the surface layer. From the viewpoint of interlayer adhesion, the same polymer component as the elastomer component constituting the surface layer is preferable.

The rubber composition for forming the compression rubber layer may contain a PVP-based resin, but it is preferable that the rubber composition does not substantially contain the PVP-based resin, and it is preferable that the rubber composition does not contain the PVP-based resin, from the viewpoint of physical properties and economic efficiency of the compression rubber layer. In the present invention, since the rubber composition for forming the surface layer contains the PVP-based resin, the above-described effects can be exhibited.

The rubber composition for forming the compression rubber layer may further contain, in addition to the elastomer component, a crosslinking agent, a reinforcing agent, and other components exemplified in the section of the surface layer. The preferred embodiment and proportion of the rubber composition are the same as those of the surface layer, and the rubber composition may be the same as the surface layer except that the rubber composition does not contain the PVP-based resin.

The Mooney scorch minimum viscosity Vm of the rubber composition forming the compression rubber layer is not particularly limited, but is preferably equal to or larger than the Vm of the rubber composition contained in the surface layer from the viewpoint of improving the durability of the belt. The Vm of the rubber composition forming the compression rubber layer may be, for example, about 50 to 150, preferably about 70 to 130, more preferably about 80 to 120, and still more preferably about 90 to 110 (particularly about 95 to 105). A difference between these Vms may be such that the Vm of the rubber composition contained in the surface layer is, for example, 0 to 40, preferably 0 to 30, and more preferably 0 to 25 lower than the Vm of the rubber composition forming the compression rubber layer. When the viscosity is adjusted to such a viscosity, in the case of the surface layer having the composite structure, the Vm of the surface layer can be lowered (to such an extent that the rubber does not completely permeate the fabric) while the Vm of the compression rubber layer is increased to increase the strength of the belt. Therefore, in the case of the surface layer having the composite structure, the rubber composition can easily penetrate into the structure of the fabric without lowering the durability of the belt, and the adhesive force between the fabric and the rubber component and the wear resistance of the fabric can be improved. When the Vm of the rubber composition is too low, the belt strength may be decreased. On the contrary, when the Vm is too high, a rib shape defect may occur.

[Structure of Frictional Power Transmission Belt]

The frictional power transmission belt of the present invention generally includes a tension layer, a compression rubber layer laminated on one surface of the tension layer, a surface layer laminated on a power transmission surface of the compression rubber layer, and a tension member (cord) embedded between the tension layer and the compression rubber layer along a longitudinal direction of the belt. Specifically, the frictional power transmission belt of the present invention may include: a tension layer forming an outer peripheral surface; a compression rubber layer laminated on one surface of the tension layer and forming an inner peripheral surface, a surface layer laminated on a power transmission surface of the compression rubber layer; and a tension member interposed between the tension layer and the compression rubber layer so as to extend in a longitudinal direction. The frictional power transmission belt of the present invention may further include an adhesive rubber layer (adhesive layer) interposed between the tension layer and the compression rubber layer. The tension member may be embedded in the adhesive rubber layer.

The type of the frictional power transmission belt is not particularly limited, and examples thereof include a V-belt [a raw edge belt (a raw edge belt having a V-shaped cross-section or the like), a raw edge cogged belt (a raw edge cogged belt in which cogs are formed on the inner peripheral side or both the inner peripheral side and the outer peripheral side of the raw edge belt)], a V-ribbed belt, and a flat belt. Among these belts, the V-ribbed belt and raw edge V-belt having high power transmission efficiency are preferable, and the V-ribbed belt is particularly preferred.

The form of the V-ribbed belt is not particularly limited, and for example, the form shown in FIG. 1 is exemplified. FIG. 1 is a schematic sectional view showing an example of the frictional power transmission belt of the present invention. In this embodiment, a V-ribbed belt 1 has a form in which a surface layer 6, a compression rubber layer 5, an adhesive rubber layer 3 in which a tension member 4 is embedded in the longitudinal direction of the belt, and a tension layer 2 formed of a cover canvas (woven material, knitted material, nonwoven fabric, or the like) are laminated in this order from a belt lower surface (inner peripheral surface) toward a belt upper surface (back surface). A plurality of V-shaped grooves in cross-section extending in the longitudinal direction of the belt are formed in the compression rubber layer 5. A plurality of ribs each having a V-shape in cross-section (i.e., inverted trapezoid shape) are formed between the grooves. Two slopes (i.e., surfaces) of each ribs form a frictional power transmission face, which comes into contact with a pulley to transmit power (i.e., frictional power transmission).

The frictional power transmission belt of the present invention is not limited to this embodiment, and may be provided with a tension layer, a compression rubber layer, and a tension member embedded between the tension layer and the compression rubber layer along the longitudinal direction of the belt. For example, the tension layer 2 may be formed of a commonly used cover canvas or rubber composition used as a tension layer, or the tension member 4 may be embedded between the tension layer 2 and the compression rubber layer 5 without providing the adhesive rubber layer 3. Further, the frictional power transmission belt may have a form in which the adhesive rubber layer 3 may be provided on either the compression rubber layer 5 or the tension layer 2, and the tension member 4 may be embedded between the adhesive rubber layer 3 (compression rubber layer 5 side) and the tension layer 2, or between the adhesive rubber layer 3 (tension layer 2 side) and the compression rubber layer 5. In addition, powdery fibers (e.g., cotton, nylon, aramid, or the like) may be planted on the surface of the surface layer 6 (in particular, the frictional power transmission surface), or a lubricant or the like may be spray-applied.

At least the surface layer contains the rubber composition, and the compression rubber layer is formed of the rubber composition, and the adhesion rubber layer may not be formed of the rubber composition of the surface layer and the compression rubber layer. The rubber composition forming the adhesive rubber layer is generally formed of the rubber composition forming the compression rubber layer. When forming the tension layer with the rubber composition, the tension layer may be formed of the rubber composition forming the compression rubber layer.

The tension member is not limited particularly. Generally, a cord (i.e., twisted cord) which is arranged at predetermined intervals in a width direction of the belt can be used. High-modulus fibers, for example, synthetic fibers such as polyester fibers (e.g., polyalkylene arylate fibers) and aramid fibers, inorganic fibers such as carbon fibers, or the like are widely used as the cord. Polyester fibers (e.g., polyethylene terephthalate fibers or polyethylene naphthalate fibers) or aramid fibers are preferred. The fibers may be a multifilament yarn, for example, a multifilament yarn having a fineness of about 2,000 to 10,000 denier (in particular, 4,000 to 8,000 denier).

As the cord, a twisted cord using multifilament yarns (e.g., plied twist, single twist, and Lung lay twist) can be generally used. An average wire diameter of the cord (i.e., a fiber diameter of the twisted cord) may be, for example, about 0.5 mm to 3 mm, preferably about 0.6 mm to 2 mm, and more preferably about 0.7 mm to 1.5 mm. The cord is arranged so as to extend in the longitudinal direction of the belt, and a plurality of cords parallel to the longitudinal direction may be arranged. From the viewpoint of productivity, generally, the cords are arranged in a spiral shape so as to extend in parallel at a predetermined pitch substantially in the longitudinal direction of the belt. When the cords are arranged in a spiral shape, an angle of the cord with respect to the longitudinal direction of the belt may be, for example, 5° or less, and from the viewpoint of belt running properties, it is preferable that the angle is closer to 0°.

In order to improve the adhesiveness to the elastomer component, the cord may be embedded between the tension layer and the compression rubber layer (in particular, in the adhesive rubber layer) after various adhesion treatments using an epoxy compound, an isocyanate compound, or the like are performed.

Further, the tension layer may include a reinforcing fabric, for example, a fabric material such as woven fabric, wide angle canvas, knitted fabric, non-woven fabric, etc. (preferably woven fabric). If necessary, the reinforcing fabric may be subjected to the adhesion treatment and laminated on the surface of the tension layer.

[Method for Producing Belt]

A method for producing a frictional power transmission belt may employ a method including a compression rubber layer winding step of winding an unvulcanized (uncross-linked) rubber sheet around a cylindrical drum, and a vulcanization molding step of pressing the unvulcanized rubber sheet against a mold to vulcanize the unvulcanized rubber sheet. The surface layer is formed in any one of the compression rubber layer winding step and the vulcanization molding step.

The method other than the method of forming a surface layer is not particularly limited as long as the method is a method of molding with a mold, and a commonly used method can be used. As the commonly used method, for example, a method can be used including a cord spinning step of winding a cord forming a tension member around a cylindrical drum, a compression rubber layer winding step of winding an unvulcanized rubber sheet on the wound cord, and a vulcanization molding step of pressing the cord and the unvulcanized rubber sheet against a mold (pressing with the mold) and vulcanizing the cord and the unvulcanized rubber sheet. In the case of forming the tension layer or the adhesive rubber layer, a step of winding a member constituting the tension layer (rubber sheet or reinforcing fabric) and, if necessary, a rubber sheet forming the adhesive rubber layer on a flexible jacket (bladder) attached to a cylindrical forming drum may be included as a step prior to the cord spinning step, and the cord may be further spun in a spiral shape on the wound member.

Specifically, in the commonly used method, first, a cylindrical inner mold mounted with a flexible jacket in its outer circumferential surface is used as an inner mold, and an unvulcanized sheet for a tension layer is wound on the flexible jacket in the outer circumferential surface. A cord for forming a tension member is spun spirally on the sheet. Further, an unvulcanized sheet for a compression rubber layer is wound to produce a laminate. Next, a cylindrical outer mold in which a plurality of rib molds have been craved in its inner circumferential surface is used as an outer mold which can be attached to the inner mold. The inner mold on which the laminate is wound is placed in the outer mold coaxially. After that, the flexible jacket is expanded toward the inner circumferential surface (i.e., rib molds) of the outer mold to press the laminate (compression rubber layer) into the rib molds, and the laminate is vulcanized. The inner mold is then extracted from the outer mold, and a vulcanized (crosslinked) rubber sleeve having a plurality of ribs is released from the outer mold. After that, the vulcanized rubber sleeve is cut with a cutter into a predetermined width in a longitudinal direction of the belt to be finished into a V-ribbed belt. In the method, the laminate having the tension layer, the tension member and the compression rubber layer can be expanded at a time to be finished into a sleeve (or a V-ribbed belt) having a plurality of ribs.

On the other hand, as other methods, for example, a method disclosed in JP-A-2004-82702 (i.e., a method in which only the compression rubber layer is expanded to form a preformed body (which is semi-vulcanized), and next the tension layer and the tension member are expanded and press-bonded to the preformed body, and vulcanized to be integrated and finished into a V-ribbed belt) may be used.

The method of forming a surface layer can be incorporated into either the compression rubber layer winding step or the vulcanization molding step in such a commonly used method. Examples thereof include a method of using, as the unvulcanized rubber sheet in the compression rubber layer winding step, a laminated sheet of a precursor for forming the surface layer (unvulcanized rubber sheet (rubber composition), or fabric and rubber composition) and an unvulcanized rubber sheet for forming the compression rubber layer. In this method, the method of preparing the laminated sheet is not particularly limited, and a commonly used method can be used. In the case where the surface layer has the single structure, for example, each unvulcanized rubber sheet separately produced by rolling or the like may be laminated, or a laminated sheet molded by co-extrusion may be used. In the case where the surface layer has the composite structure, as a precursor for forming the surface layer, an unvulcanized rubber sheet and a fabric may be sequentially wound and laminated on the unvulcanized rubber sheet for forming the compression rubber layer. In particular, in the surface layer having the composite structure, the fabric may be disposed on the outermost surface, and in the producing process of the belt, a part of the unvulcanized rubber sheet may be penetrated into the entire fabric to produce the surface layer formed of the rubber layer and the rubber fiber mixed layer.

In a method for preparing the rubber composition for forming the surface layer or the compression rubber layer, the rubber composition can be prepared by mixing (or kneading) each component by a common method, but in order to uniformly mix, it is preferable to knead the elastomer component, the PVP-based resin, and other components under heating. The heating temperature is, for example, 120° C. or less, preferably 50° C. to 120° C., more preferably 60° C. to 100° C., and still more preferably 70° C. to 90° C. When the heating temperature is too high, the elastomer component may be crosslinked.

EXAMPLE

The present invention is described below in detail based on examples. However, the present invention is not limited by the examples. Details of the raw materials used in Examples are shown below.

[Raw Material]

(Rubber Composition)

EPDM1: "Nordel (registered trademark) IP3640" manufactured by The Dow Chemical Company, Mooney viscosity (125° C.) of approximately equal to 40, ethylene content: 55 mass %, diene content: 1.8 mass %

EPDM2: "EPT4045M" manufactured by Mitsui Chemicals, Inc., Mooney viscosity (125° C.) of approximately equal to 45, ethylene content: 51 mass %, diene content: 7.6 mass %

Polyvinyl pyrrolidone 1: "Polyvinyl pyrrolidone K-30" manufactured by Nippon Shokubai Co., Ltd., K value: 27.0 to 33.0

Polyvinyl pyrrolidone 2: "Polyvinyl pyrrolidone K-90" manufactured by Nippon Shokubai Co., Ltd., K value 88.0 to 96.0

Polyvinyl pyrrolidone 3: "Polyvinyl pyrrolidone K-25" manufactured by FUJIFILM Wako Pure Chemical Corporation, K value: 22.5 to 27.0

Polypropylene: "PPW-5" manufactured by Seishin Enterprise Co., Ltd., average particle diameter: about 5 μm, melting point: 165° C.

Surfactant: "EMULGEN LS-106" manufactured by Kao Corporation, polyoxyalkylene alkyl ether Polyvinyl alcohol: "DENKA POVAL F-300S" manufactured by Denka Co., Ltd., polyvinyl alcohol hydrophobic group-modified product, saponification degree: 93.0 mol to 97.0 mol, viscosity average polymerization degree: 1,700, melting point: 206° C., type of hydrophobic group; alkyl group Carbon black: "SEAST 3" manufactured by Tokai Carbon Co., Ltd.

Silica: "Ultrasil VN3" manufactured by Evonik Industries AG, BET specific surface area: 180 $m^2/g$ Paraffin oil: "Diana (registered trademark) PW-90" (paraffinic-based process oil) manufactured by Idemitsu Kosan Co., Ltd.

Zinc oxide: "Zinc Oxide second grade" manufactured by Hakusui tech Co., Ltd.

Stearic acid: "Stearic acid Tsubaki" manufactured by NOF Corporation

Anti-aging agent 1: benzimidazole anti-aging agent, "Nocrac MB" manufactured by Ouchi Shinko Chemical Industrial Co., Ltd.

Anti-aging agent 2: diphenylamine anti-aging agent, "Nocrac AD-F" manufactured by Ouchi Shinko Chemical Industrial Co., Ltd.

Co-crosslinking agent: "VULNOC PM" manufactured by Ouchi Shinko Chemical Industrial Co., Ltd Organic peroxide: "PERBUTYL P-40 MB" manufactured by NOF Corporation Sulfur: manufactured by Miwon Chemicals Co., Ltd Vulcanization accelerator: "Nocceler (registered trademark) DM" manufactured by Ouchi Shinko Chemical Industrial Co., Ltd.

Carbon black dispersion liquid; "Aqua-Black 162" manufactured by Tokai Carbon Co., Ltd., solid content: 19.2 mass %

(Cotton Woven Fabric)

Plain woven fabric having cotton yarn 20 s/2, warp yarns 70 yarns/5 cm, and weft yarns 70 yarns/5 cm (Knitted Fabric for Surface Layer)

A treated knitted fabric obtained by knitting a cotton spun yarn (count: 40, 1 yarn) as water-absorbent fibers and a PPT/PET conjugate yarn (fineness: 84 dtex) as second fibers, immersing a knitted fabric base material with a weft knitting structure (moss stitch, 2 layers) in an aqueous solution obtained by diluting a thermal reactive isocyanate ("Elastron BN-27" manufactured by Dai-ichi Kogyo Seiyaku Co., Ltd., a dissociation temperature: 180° C., an aqueous isocyanate-based crosslinking agent having a solid content concentration of 30 mass %) with water so as to have a solid content concentration of 5 mass %, and then drying the knitted fabric base material.

(Cord)

Twisted cord prepared by twisting 1.000-denier PET fiber in a twist configuration of 2×3 with a final twisting coefficient of 3.0 and a primary twisting coefficient of 3.0, and subjecting the obtained cord having a total denier of 6,000 to a bonding treatment; cord diameter of 1.0 mm.

Examples 1 to 17 and Comparative Examples 1 to 8

[Surface Layer and Compression Rubber Layer]

For a surface layer and a compression rubber layer forming a power transmission surface (contact surface with a pulley) of a belt, a sheet was used obtained by kneading a rubber composition for a surface layer and a compression rubber layer having a formulation shown in Table 1 at 140° C. using a Banbury mixer and rolling the kneaded mixture into a predetermined thickness using a calendar roll. A thickness of the sheet for the surface layer was adjusted to a thickness at which the thickness of the surface layer was 500 μm. In Comparative Examples 1 and 5, the surface layer was not formed, and in Comparative Example 8, the surface layer described later was formed.

[Crosslinked Rubber Properties of Surface Layer and Compression Rubber Layer Composition]

Uncrosslinked (unvulcanized) rubber sheets for the surface layer and the compression rubber layer were pressed and heated (temperature: 180° C., surface pressure: 0.9 MPa) for 30 minutes using a press machine to prepare crosslinked rubber sheets.

1) Measurement of μ-V Characteristic

A disk-shaped test piece having a diameter of 8 mm and a thickness of 2 mm was taken from the crosslinked rubber sheet, and a friction force was measured using a pin-on-disk friction coefficient measuring device to calculate the friction coefficient. Specifically, the test piece was pressed with a load of 2.192 kgf/cm² using a mating material (SUS304) having a surface roughness Ra of 0.8 μm, and the friction force was measured at a friction speed of 0 m/sec to 2.0 m/sec while applying water to the test piece only when the measurement was performed at a water amount of 30 ml/min, and a slope of a curve of a friction coefficient with respect to a friction speed (sliding speed with respect to a mating material) was calculated by a least-squares method. The slope represents a change in the friction coefficient with respect to the slip speed.

Further, an accelerated aging test according to JIS K6257 (2010) was performed, and the friction force was also measured for the test piece after heat aging was performed at 150° C. for 720 hours, and the slope of the curve of the friction coefficient with respect to the friction speed (sliding speed with respect to the mating material) was calculated by the least-squares method.

As the pin-on-disk friction coefficient measuring device, a "pin-on-disk friction testing machine" manufactured by Yonekura MFG. Co., Ltd. was used. In the accelerated aging test, an A method AA-2 forced-circulation thermal aging testing machine (crosswind type) was used.

2) Measurement of Dynamic Viscoelasticity (E', Tan δ)

A test piece having a rectangular cross-sectional shape (thickness: 2.0 mm, width: 4.0 mm) and a length of 40 mm was taken from the crosslinked rubber sheet. At this time, a reverse grain direction of the rolling was taken as a length direction. Then, the test piece was chucked and fixed to a chuck of a viscoelasticity measuring device ("VR-7121" manufactured by Ueshima Seisakusho Co., Ltd.) at a chuck-to-chuck distance of 15 mm, an initial strain (static strain) of 1.0% was applied, an elastic modulus (E') and a loss tangent (tan δ) at 70° C. were obtained at a frequency of 10 Hz, a dynamic strain of 0.2% (that is, a strain of ±0.2% was applied in a longitudinal direction with the initial strain of 1.0% as a center position or a reference position), and a heating rate of 1° C./min.

3) Mooney Scorch Minimum Viscosity (Vm)

Figure 2:
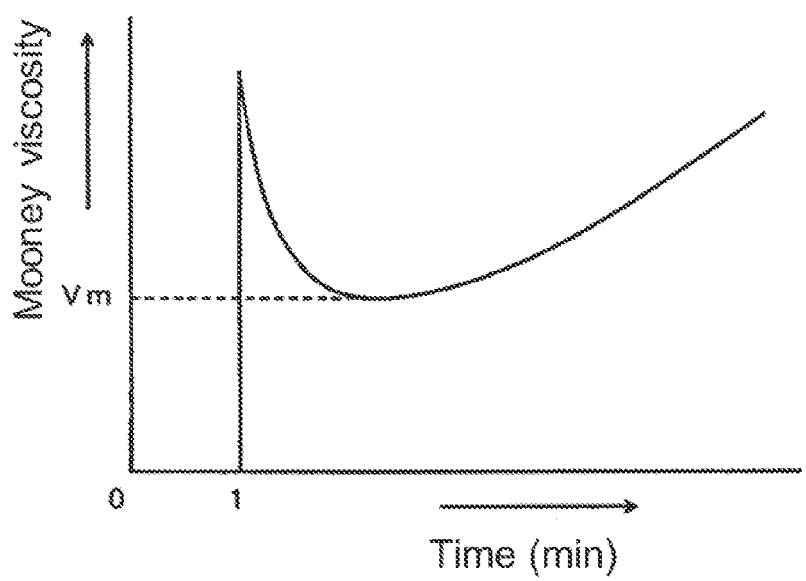
FIG. 2 is a graph showing the behavior of Mooney viscosity for illustrating a method for measuring Mooney Scorch minimum viscosity (Vm).

The Mooney Scorch minimum viscosity was measured according to a Mooney scorch test of JIS K6300-1 (2013). An L-shaped rotor was used and a test temperature was set to 125° C. A polyester film having a thickness of about 0.04 mm ("Lumirror" manufactured by Toray Industries, Inc.) was disposed between surfaces of a test piece (uncrosslinked rubber composition) and a die. After closing the die, preheating was performed for 1 minute, thereafter the rotor was rotated and the transition of the Mooney viscosity was recorded. The recorded Mooney viscosity generally showed the behavior shown in FIG. 2 below, and a value when the Mooney viscosity is the lowest was adopted as the Mooney Scorch minimum viscosity (Vm).

TABLE 1

(Compression rubber layer and composition for surface layer)

| | | Rubber composition | A | B | C | D | E | F | G |
|---|---|---|---|---|---|---|---|---|---|
| Composition (part by mass) | | EPDM1 | 100.0 | 100.0 | 100.0 | 100.0 | 100.0 | 100.0 | 100.0 |
| | | Polyvinyl pyrrolidone 1 | — | 5.0 | — | — | 1.0 | 7.0 | 10.0 |
| | | Polyvinyl pyrrolidone 2 | — | — | 5.0 | — | — | — | — |
| | | Polyvinyl pyrrolidone 3 | — | — | — | 5.0 | — | — | — |
| | | Surfactant | — | — | — | — | — | — | — |
| | | Polyvinyl alcohol | — | — | — | — | — | — | — |
| | | Carbon black | 60.0 | 60.0 | 60.0 | 60.0 | 60.0 | 60.0 | 60.0 |
| | | Paraffin oil | 5.0 | 5.0 | 5.0 | 5.0 | 5.0 | 5.0 | 5.0 |
| | | Zinc oxide | 5.0 | 5.0 | 5.0 | 5.0 | 5.0 | 5.0 | 5.0 |
| | | Stearic acid | 1.5 | 1.5 | 1.5 | 1.5 | 1.5 | 1.5 | 1.5 |
| | | Anti-aging agent 1 | 2.5 | 2.5 | 2.5 | 2.5 | 2.5 | 2.5 | 2.5 |
| | | Co-crosslinking agent | 2.0 | 2.0 | 2.0 | 2.0 | 2.0 | 2.0 | 2.0 |
| | | Organic peroxide | 5.0 | 5.0 | 5.0 | 5.0 | 5.0 | 5.0 | 5.0 |
| | | Sulfur | 0.2 | 0.2 | 0.2 | 0.2 | 0.2 | 0.2 | 0.2 |
| Rubber properties | Grip property μ-V Characteristic | Friction coefficient when submerged | 0.105 | 0.101 | 0.102 | 0.099 | 0.104 | 0.100 | 0.097 |
| | | Slope of friction coefficient-slip speed curve | | | | | | | |
| | | Before heat aging | −0.204 | −0.101 | −0.115 | −0.096 | −0.137 | −0.105 | −0.108 |
| | | After heat aging for 30 days | −0.256 | −0.162 | −0.171 | −0.153 | −0.211 | −0.155 | −0.161 |
| | | Difference | 0.052 | 0.061 | 0.056 | 0.057 | 0.074 | 0.050 | 0.053 |
| | Elastic characteristic | Elastic modulus (reverse grain) 70° C. (MPa) | 36.22 | 33.40 | 34.67 | 33.41 | 36.41 | 36.41 | 35.15 |
| | Internal heat generation | tanδ (reverse grain) 70° C. | 0.143 | 0.142 | 0.138 | 0.142 | 0.141 | 0.147 | 0.146 |
| | Viscocity | Vm | 100 | 100 | 100 | 100 | 100 | 100 | 100 |

| | | Rubber composition | H | I | J | K | L | M |
|---|---|---|---|---|---|---|---|---|
| Composition (part by mass) | | EPDM1 | 100.0 | 100.0 | 100.0 | 100.0 | 100.0 | 100.0 |
| | | Polyvinyl pyrrolidone 1 | 15.0 | 20.0 | 25.0 | — | — | — |
| | | Polyvinyl pyrrolidone 2 | — | — | — | — | — | — |
| | | Polyvinyl pyrrolidone 3 | — | — | — | — | — | — |
| | | Surfactant | — | — | — | 5.0 | 15.0 | — |
| | | Polyvinyl alcohol | — | — | — | — | — | 5.0 |
| | | Carbon black | 60.0 | 60.0 | 60.0 | 60.0 | 60.0 | 60.0 |
| | | Paraffin oil | 5.0 | 5.0 | 5.0 | 5.0 | 5.0 | 5.0 |
| | | Zinc oxide | 5.0 | 5.0 | 5.0 | 5.0 | 5.0 | 5.0 |
| | | Stearic acid | 1.5 | 1.5 | 1.5 | 1.5 | 1.5 | 1.5 |
| | | Anti-aging agent 1 | 2.5 | 2.5 | 2.5 | 2.5 | 2.5 | 2.5 |
| | | Co-crosslinking agent | 2.0 | 2.0 | 2.0 | 2.0 | 2.0 | 2.0 |
| | | Organic peroxide | 5.0 | 5.0 | 5.0 | 5.0 | 5.0 | 5.0 |
| | | Sulfur | 0.2 | 0.2 | 0.2 | 0.2 | 0.2 | 0.2 |
| Rubber properties | Grip property μ-V Characteristic | Friction coefficient when submerged | 0.095 | 0.097 | 0.095 | 0.081 | 0.068 | 0.098 |
| | | Slope of friction coefficient-slip speed curve | | | | | | |
| | | Before heat aging | −0.105 | −0.101 | −0.099 | −0.122 | −0.110 | −0.107 |
| | | After heat aging for 30 days | −0.158 | −0.151 | −0.155 | −0.204 | −0.189 | −0.165 |
| | | Difference | 0.053 | 0.050 | 0.056 | 0.082 | 0.079 | 0.058 |
| | Elastic characteristic | Elastic modulus (reverse grain) 70° C. (MPa) | 37.85 | 37.51 | 37.13 | 28.90 | 19.60 | 34.20 |
| | Internal heat generation | tanδ (reverse grain) 70° C. | 0.152 | 0.152 | 0.154 | 0.150 | 0.165 | 0.143 |
| | Viscocity | Vm | 100 | 100 | 100 | 100 | 100 | 100 |

[Adhesive Rubber Layer]

A sheet for an adhesive rubber layer was obtained by kneading a rubber composition for an adhesive rubber layer having a formulation shown in Table 2 using a Banbury mixer, and rolling the kneaded mixture into a predetermined thickness using a calender roll.

TABLE 2

(Composition for adhesive rubber layer)

| Composition | Parts by mass |
|---|---|
| EPDM2 | 100 |
| Stearic acid | 1 |
| Zinc oxide | 5 |
| Carbon black | 35 |
| Silica | 20 |
| Resorcinol formaldehyde condensate | 0 |
| Anti-aging agent 2 | 0 |
| Vulcanization accelerator | 1 |
| Hexamethoxy methylol melamine | 2 |
| Sulfur | 1 |
| Total | 169 |

[Tension Layer]

As a cotton woven fabric for forming a tension layer, a cotton woven fabric was used obtained by immersing an untreated cotton woven fabric (plain weave of cotton yarn 20 s/2, warp yarns 70 vans/5 cm, and weft yarns 70 yarns/5 cm) in a composition for a tension laver (black dyeing liquid) shown in Table 3 and containing a carbon black dispersion liquid and an RFL liquid (latex, resorcin, and formalin) for 10 seconds, performing a wide angle treatment at 120° by a tenter, and performing a heat treatment at 150° C. for 4 minutes.

TABLE 3

(Composition for tension layer)

| Composition | Parts by mass |
|---|---|
| 40 mass % vinyl pyridine latex | 100.0 |
| Carbon black dispersion | 214.3 |
| Resorcin | 14.6 |
| 37% formalin | 9.2 |
| Caustic soda | 1.5 |
| Water | 436.0 |
| Total | 775.6 |

[Producing V-Ribbed Belt]

In Examples 1 to 9 and Comparative Examples 1 to 4, a cotton woven fabric for forming a tension layer and a sheet for an adhesive rubber layer were sequentially wound around an outer periphery of a bladder of a mold provided with an air supply port and a top plate, a cord serving as a tension member was spirally wound around an outer peripheral surface of the sheet for an adhesive rubber layer, and then a sheet for a compression rubber layer and a sheet for a surface layer were sequentially wound on the tension member (in Comparative Example 1, the sheet for a surface layer was not wound), thereby forming an uncrosslinked belt sleeve.

In Examples 10 to 17 and Comparative Examples 5 to 7, a cotton woven fabric for forming a tension layer and a sheet for an adhesive rubber layer were sequentially wound around an outer periphery of a bladder of a mold (inner mold) provided with an air supply port and a top plate, a cord serving as a tension member was spirally wound around an outer peripheral surface of the sheet for an adhesive rubber layer, and then a sheet for a compression rubber layer, a sheet for a surface layer, and a knitted fabric for a surface layer were sequentially wound on the tension member (in Comparative Example 5, the sheet for a surface layer was not wound), thereby forming an uncrosslinked belt sleeve. The obtained surface layer had a two-layer structure of a rubber layer and a rubber fiber mixed layer obtained by impregnating a knitted fabric with a rubber composition, and the average thickness ratio of both layers was rubber layer/rubber fiber mixed layer=1/1.

In Comparative Example 8, a cotton woven fabric for forming a tension layer and a sheet for an adhesive rubber layer were sequentially wound around an outer periphery of a bladder of a mold (inner mold) provided with an air supply port and a top plate, a cord serving as a tension member was spirally wound around an outer peripheral surface of the sheet for an adhesive rubber layer, and then a sheet for a compression rubber layer was further wound on the tension member. Using a powder coating device ("Ancol XT Hand Gunn" manufactured by Nodon Co., Ltd.), a mixed powder in which polyvinyl pyrrolidone 1 and polypropylene were mixed at a mass ratio of 25:75 was sprayed onto a frictional power transmission surface of the belt sleeve under the condition of a spraying amount of 50 g/m² to form an uncrosslinked belt sleeve.

Further, the mold (inner mold) around which the uncrosslinked belt sleeve was wound by each method was set in a vulcanizing mold (outer mold), and the bladder was expanded while being heated by a heating/cooling jacket provided with a heating/cooling medium introduction port, and the uncrosslinked belt sleeve was pressed against the inner peripheral surface of the vulcanizing mold to be pressurized, thereby performing vulcanization. Vulcanization conditions were set to 180° C., 0.9 MPa, and 30 minutes. At this time, grooves (rib shape) were formed on the outer periphery of the belt sleeve by a concave-convex portion for molding of the vulcanization mold biting into the belt sleeve from the outer periphery.

Next, the mold was taken out from the vulcanization mold, the crosslinked belt sleeve remaining in the vulcanization mold was cooled by a heating and cooling jacket, and then the crosslinking belt sleeve was taken out from the vulcanization mold. The crosslinked belt sleeve was cut so as to be cut into round slices by a cutter to obtain a 3PK1100 V-ribbed belt (number of ribs: 3, peripheral length: 1,100 mm, belt type: K type, belt thickness; 4.3 mm, rib height: about 2 mm, rib pitch; 3.56 mm), a 6PK980 V-ribbed belt (number of ribs; 6, peripheral length: 980 mm, belt type: K type, belt thickness: 4.3 mm, rib height: about 2 mm, rib pitch: 3.56 mm), and a 6PKI100 V-ribbed belt (number of ribs: 6, peripheral length: 1,100 mm, belt type: K type, belt thickness: 4.3 mm, rib height: about 2 mm, rib pitch: 3.56 mm). The 6PK980 V-ribbed belts were produced only in Examples 10 to 17 and Comparative Examples 5 to 7.

[Evaluation of Performance of V-Ribbed Belt]

1) Noise Limit Angle Test (Misalignment Noise Evaluation Test)

Figure 3:
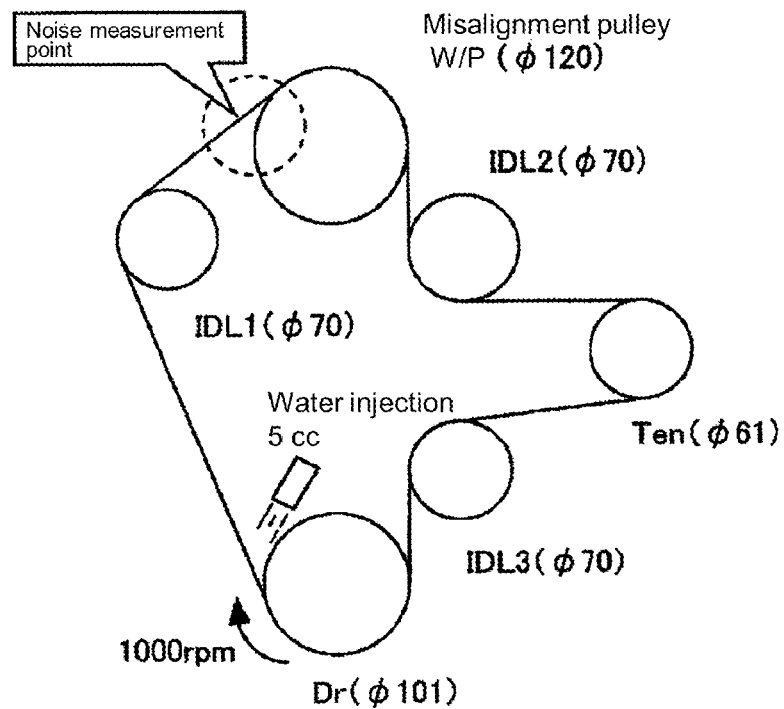
FIG. 3 is a schematic diagram showing a layout of a misalignment noise test of belts obtained in Examples 1 to 9 and Comparative Examples 1 to 4 and 8.

A noise limit angle test (misalignment noise evaluation test) was performed using a testing machine having a layout shown in FIG. 3 in which a driving pulley (Dr.) having a diameter of 101 mm, an idler pulley (IDL1) having a diameter of 70 mm, a misalignment pulley (W/P) having a diameter of 120 mm, an idler pulley (IDL2) having a diameter of 70 mm, a tension pulley (Ten) having a diameter of 61 mm, and an idler pulley (IDL3) having a diameter of 70 mm were arranged in this order. An axis distance (span length) between the idler pulley (IDL1) and the misalignment pulley was set to 135 mm, and all of the pulleys were adjusted so as to locate on the same plane (angle of misalignment: 0°).

That is, the 6PK1100 V-ribbed belts obtained in Examples 1 to 9 and Comparative Examples 1 to 4 and 8 were suspended on each pulley of the testing machine, tension was applied so that the rotation speed of the driving pulley was 1000 rpm and the belt tension was 50 N/Rib under a room temperature condition, 5 ml of water was injected periodically (at intervals of about 30 seconds) onto a frictional power transmission surface of the V-ribbed belt in the vicinity of an outlet of the driving pulley, and an angle (noise limit angle) was obtained at which noise (in the vicinity of an inlet of the misalignment pulley) occurred when the belt was run with misalignment (misalignment pulley was shifted to a front side with respect to each pulley). The larger the noise limit angle is, the more excellent the noise suppression is. Generally, the belt is misaligned from the pulley (that is, rib misalignment occurs) at around 30, and the power is not normally transmitted.

Figure 4:
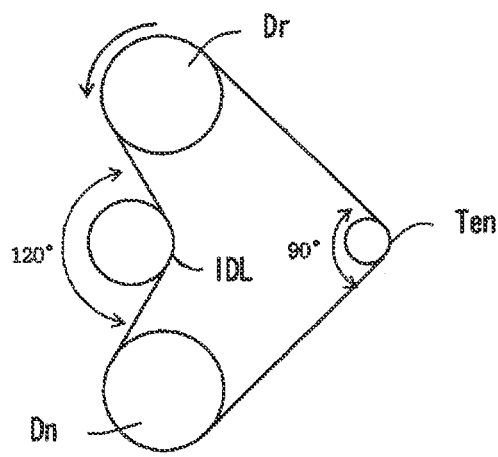
FIG. 4 is a schematic diagram showing a layout of a running test for performing the misalignment noise test after running of the belts obtained in Examples 1 to 9 and Comparative Examples 1 to 4 and 8.

For the evaluation of the belt after running, a belt was used after running with a running testing machine having a layout shown in FIG. 4 in which a driving pulley (Dr.) having an outer diameter of 120 mm, an idler pulley (IDL) having an outer diameter of 85 mm, a driven pulley (Dn.) having an outer diameter of 120 mm, and a tension pulley (Ten.) having an outer diameter of 45 mm were arranged in this order. The 6PK1100 V-ribbed belt was hung on each pulley of the testing machine, and a winding angle of the belt around the idler pulley was adjusted to 120°, a winding angle of the belt around the tension pulley was adjusted to 90°, and the belt tension was adjusted to 395 N. The noise limit angle test was performed on a belt that had been run for 200 hours at the rotation speed of the driving pulley of 4900 rpm (a direction of rotation was the direction of the arrow in the figure), the driven pulley load of 8.8 kW, and the ambient temperature of 140° C.

2) Water Injection Noise Resistance Test

Figure 5:
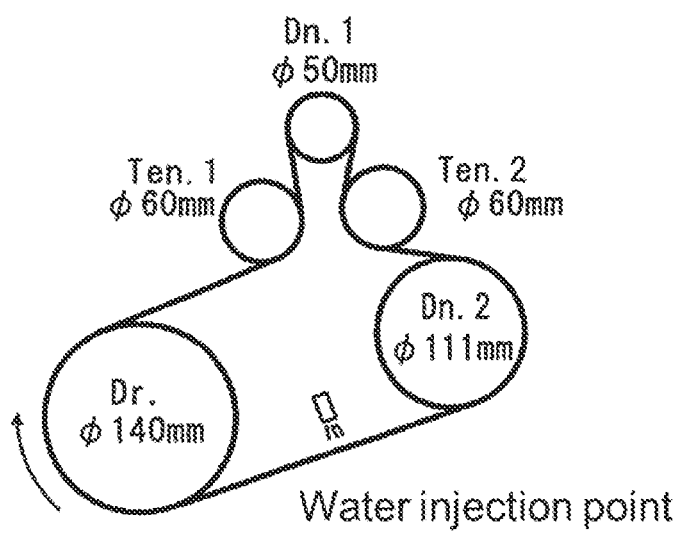
FIG. 5 is a schematic diagram showing a layout of a water injection noise resistance test of belts obtained in Examples 10 to 17 and Comparative Examples 5 to 7.

The 6PK980 V-ribbed belts obtained in Examples 10 to 17 and Comparative Examples 5 to 7 were run by a testing machine having a layout shown in FIG. 5, and the water injection noise resistance was evaluated. The testing machine was equipped with a driving pulley (Dr.) having a diameter of 140 mm, a tension pulley 1 (Ten. 1) having a diameter of 60 mm, a driven pulley 1 (Dn. 1) having a diameter of 50 mm, a tension pulley 2 (Ten. 2) having a diameter of 60 mm, and a driven pulley 2 (Dn. 2) having a diameter of 111 mm. The rotation speed of the driving pulley was varied at 800+160 rpm. The load of the driven pulley 1 was set to 16 N m, and the load of the driven pulley 2 was set to no load. The belt tension was set to 200 N/6 ribs. Water was intermittently injected from the compression rubber layer side of the belt at a position at a center between the driving pulley and the driven pulley 2. Water injection was performed once every 60 seconds (for 5 seconds). The amount of water injection was 100 cc/s (500 cc/5 s). The test temperature (atmospheric temperature) was set to 25° C., and the test time was set to 60 minutes. The presence or absence of abnormal noise during the test was confirmed by hearing.

Figure 6:
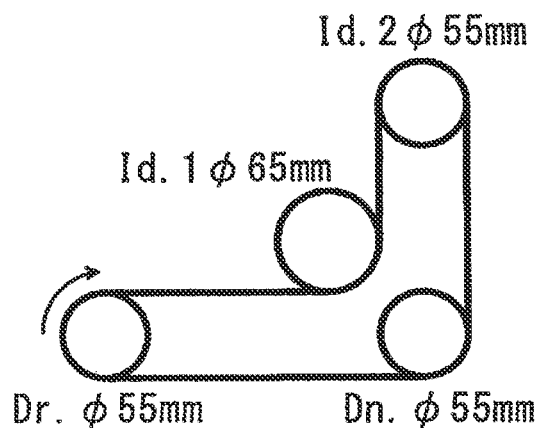
FIG. 6 is a schematic diagram showing a layout of a running test for performing the water injection noise resistance test after running of the belts obtained in Examples 10 to 17 and Comparative Examples 5 to 7.

For the evaluation of the belt after running, a belt was used after running with a four-axis running testing machine having a layout shown in FIG. 6 in which a driving pulley (Dr.) having a diameter of 55 mm, an idler pulley 1 (Id.1) having a diameter of 65 mm, an idler pulley 2 (Id.2) having a diameter of 55 mm, and a driven pulley (Dn.) having a diameter of 55 mm were arranged in this order. The 6PK980 V-ribbed belt was hung on each pulley of the four-axis running testing machine, and a water injection noise resistance test was conducted on the belt that had been run for 300 hours at an ambient temperature of 60° C., the rotation speed of the driving pulley of 2000 rpm, the idler pulley and the driven pulley under no load, and a belt tension of 80 N/rib.

3) Transmission Performance Test

Figure 7:
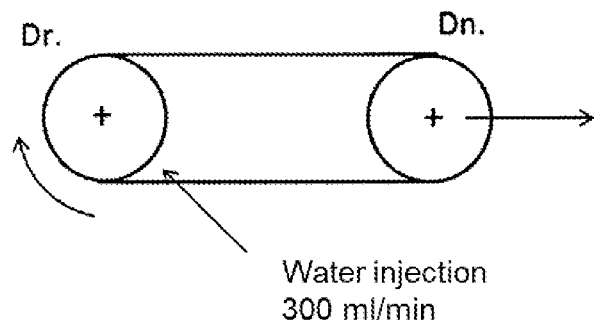
FIG. 7 is a schematic diagram showing a layout of a transmission performance test of belts obtained in Examples and Comparative Examples.

In the transmission performance test, a testing machine was used having a layout shown in FIG. 7 in which a driving pulley (Dr.) having a diameter of 120 mm and a driven pulley (Dn.) having a diameter of 120 mm were arranged in this order. Then, the 3PK1100 V-ribbed belt was hung on both pulleys of the testing machine, the V-ribbed belt was run under test conditions of the rotation speed of the driving pulley of 2000 rpm and a belt tension of 15.3 kgf/3 ribs, a load was gradually applied to a driven pulley, 300 ml of water was injected periodically (at intervals of about 60 seconds) onto a frictional power transmission surface of the V-ribbed belt in the vicinity of an inlet of the driving pulley, and a transmission power (kw) when a slip ratio of the belt became 2% was measured.

4) Durability Running Test (High-Temperature Low Tension Bending Fatigue Test)

Figure 8:
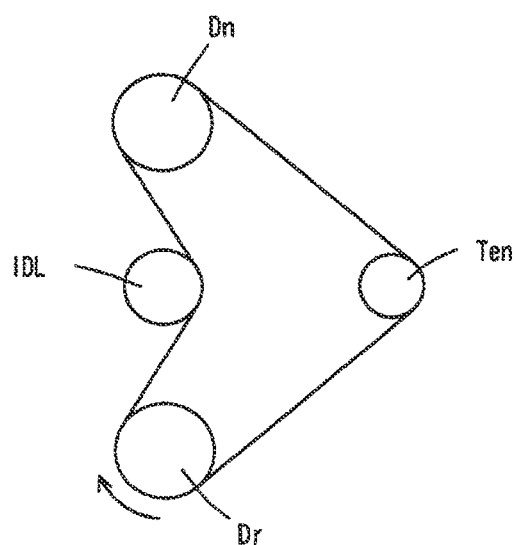
FIG. 8 is a schematic diagram showing a layout of a durability running test of belts obtained in Examples and Comparative Examples.

A testing machine was used having a layout shown in FIG. 8 in which a driving pulley (Dr.) having an outer diameter of 120 mm, an idler pulley (IDL) having an outer diameter of 85 mm, a driven pulley (Dn.) having an outer diameter of 120 mm, and a tension pulley (Ten.) having an outer diameter of 45 mm were arranged in this order. The 3PK1100 V-ribbed belt was hung on each pulley of the testing machine, and a winding angle of the V-ribbed belt around the tension pulley was adjusted to 90°, and a winding angle of the V-ribbed belt around the idler pulley was adjusted to 120°. The 3PK1100 V-ribbed belt was run for an upper limit of 600 hours with the rotation speed of the driving pulley being 4900 rpm (the rotation direction was the direction of the arrow in the figure), the belt tension being 40 kgf/3 ribs, the ambient temperature being 120° C., and a load of 12 PS being applied to the driven pulley. When an abnormality such as a crack occurred in the rubber layer of the belt before 600 hours were reached, the time was determined to be the end of life, and the running was stopped. In the case where no failure or abnormality occurred that would result in the end of the life even after completing running for 600 hours, the belt was determined as a belt having a running life of 600 hours or more, and was determined as a belt having excellent crack resistance.

5) Measurement of Transmission Loss (Torque Loss)

Figure 9:
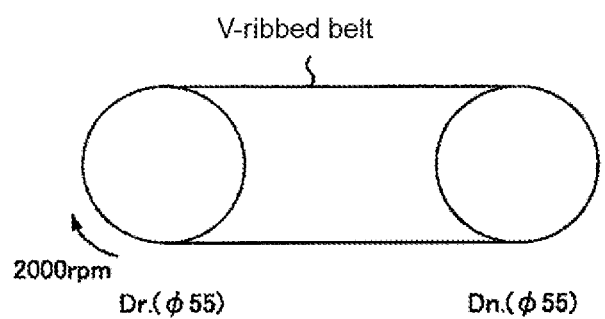
FIG. 9 is a schematic diagram showing a layout of a biaxial running test for measuring transmission loss of V-ribbed belts obtained in Examples and Comparative Examples.

A biaxial running testing machine was used having a layout shown in FIG. 9, which includes a driving pulley (Dr) having a diameter of 55 mm and a driven pulley (Dn) having a diameter of 55 mm. The 6PK1100 V-ribbed belt was hung on the testing machine, a predetermined initial tension was applied to the V-ribbed belt with a tension of 500 N/one belt, and a difference between a drive torque and a driven torque when the driving pulley was rotated at 2000 rpm with no load on the driven pulley was calculated as a torque loss. The torque loss obtained by this measurement includes not only the torque loss caused by the V-ribbed belt but also the torque loss caused by the bearing of the testing machine. Therefore, a metal belt (material: maraging steel) in which the torque loss of the belt is considered to be substantially 0 was run in advance, and the difference between the drive torque and the driven torque was obtained as the torque loss (bearing loss) caused by the bearing. Then, a value obtained by subtracting the torque loss caused by the bearing (i.e., bearing loss) from the torque loss calculated by running the V-ribbed belt (torque loss caused by both of the belt and the bearing) was obtained as the torque loss caused by the belt alone. The torque loss (i.e., bearing loss) is a torque loss obtained from the metal belt running with predetermined initial tension (for example, torque loss obtained from the metal belt running with the same initial tension as the initial tension of 500 N per belt applied to the V-ribbed belt which is running is the bearing loss).

When power is transmitted, the energy loss (transmission loss) occurs. Examples of the energy loss include an internal loss caused by self-heating of the rubber composition constituting the belt and a bending loss caused by bending deformation of the belt. Generally, a "torque loss" value calculated by a difference between a drive torque value in a drive shaft and a driven torque value in a driven shaft is used as an index of the energy loss, it can be determined that the smaller the torque loss is, the better the transmission efficiency is (the smaller the transmission loss is), and the "torque loss" value is also used as an index of fuel saving performance in an automobile engine or the like. Also in this test, the transmission efficiency affecting the fuel saving performance was compared from the measurement result of the torque loss.

The evaluation results of Examples and Comparative Examples are shown in Tables 4 to 6.

TABLE 4

| | | | Comp. Example | Example | | | | | |
|---|---|---|---|---|---|---|---|---|---|
| | | | 1 | 1 | 2 | 3 | 4 | 5 | 6 |
| Surface layer | | Rubber composition | — | B | C | D | E | F | G |
| | | Noise suppression improver | — | PVP1 | PVP2 | PVP3 | PVP1 | PVP1 | PVP1 |
| | | Average thickness (μm) | — | 300 | 300 | 300 | 300 | 300 | 300 |
| Compression rubber layer | | Rubber composition | A | A | A | A | A | A | A |
| Belt perfor-mance | Noise suppression | Noise limit angle test (°) | | | | | | | |
| | | Sample before running for 200 hours / When dry | 1.8 | 3.0 or more | 3.0 or more | 3.0 or more | 3.0 or more | 3.0 or more | 3.0 or more |
| | | Sample before running for 200 hours / When submerged | 1.00 | 3.0 or more | 3.0 or more | 3.0 or more | 3.0 or more | 3.0 or more | 3.0 or more |
| | | Sample after running for 200 hours / When submerged | 0.8 | 1.8 | 2.4 | 2.3 | 1.8 | 2.3 | 2.2 |
| | Transmission performance | Transmission power (kW) when submerged | 1.766 | 1.761 | 1.772 | 1.786 | 1.780 | 1.781 | 1.777 |
| | Transmission efficiency | Torque loss (N · m) | 0.26 | 0.262 | 0.265 | 0.271 | 0.261 | 0.270 | 0.268 |
| | Durability | Durability running test for 600 hours (lifetime) | running completion | running completion | running completion | running completion | running completion | running completion | running completion |

| | | | Example | | | Comp. Example | | |
|---|---|---|---|---|---|---|---|---|
| | | | 7 | 8 | 9 | 7 | 3 | 4 |
| Surface layer | | Rubber composition | H | I | J | K | L | M |
| | | Noise suppression improver | PVP1 | PVP1 | PVP1 | Surfactant | Surfactant | PAA |
| | | Average thickness (μm) | 300 | 300 | 300 | 300 | 300 | 300 |
| Compression rubber layer | | Rubber composition | A | A | A | A | A | A |
| Belt perfor-mance | Noise suppression | Noise limit angle test (°) | | | | | | |
| | | Sample before running for 200 hours / When dry | 3.0 or more | 3.0 or more | 3.0 or more | 3.0 or more | 3.0 or more | 3.0 or more |
| | | Sample before running for 200 hours / When submerged | 3.0 or more | 3.0 or more | 3.0 or more | 2.5 | 3.0 or more | 2.5 |
| | | Sample after running for 200 hours / When submerged | 2.3 | 2.5 | 2.4 | 1.00 | 1.2 | 1.7 |
| | Transmission performance | Transmission power (kW) when submerged | 1.783 | 1.785 | 1.785 | 1.605 | 1.489 | 1.708 |
| | Transmission efficiency | Torque loss (N · m) | 0.275 | 0.274 | 0.275 | 0.302 | 0.330 | 0.278 |
| | Durability | Durability running test for 600 hours (lifetime) | running completion | running completion | running completion | running completion | running completion | 420 hr crack |

TABLE 5

|  |  | Comp. Example | Example | | | | |
|---|---|---|---|---|---|---|---|
|  |  | 5 | 10 | 11 | 12 | 13 | 14 |
| Surface layer | Fabric | Knitted fabric | Knitted fabric | Knitted fabric | Knitted fabric | Knitted fabric | Knitted fabric |
|  | Rubber composition | — | B | C | D | E | F |
|  | Noise suppression improver | — | PVP1 | PVP2 | PVP3 | PVP1 | PVP1 |
|  | Average thickness (μm) | — | 500 | 500 | 500 | 500 | 500 |
| Compression rubber layer | Rubber composition | A | A | A | A | A | A |
| Belt performance — Noise suppression | Water injection noise resistance test Noise time measurement (min) |  |  |  |  |  |  |
|  | Before running | 60 or more | 60 or more | 60 or more | 60 or more | 60 or more | 60 or more |
|  | After running for 300 hours | 45 | 60 or more | 60 or more | 60 or more | 60 or more | 60 or more |
| Transmission performance | Transmission power (kW) when submerged | 3.150 | 3.143 | 3.156 | 3.151 | 3.140 | 3.146 |
| Transmission efficiency | Torque loss (N·m) | 0.315 | 0.317 | 0.305 | 0.324 | 0.316 | 0.320 |
| Durability | Durability running test for 600 hours (lifetime) | running completion | running completion | running completion | running completion | running completion | running completion |

|  |  | Example | | | Comp. example | |
|---|---|---|---|---|---|---|
|  |  | 15 | 16 | 17 | 6 | 7 |
| Surface layer | Fabric | Knitted fabric | Knitted fabric | Knitted fabric | Knitted fabric | Knitted fabric |
|  | Rubber composition | G | H | G | K | M |
|  | Noise suppression improver | PVP1 | PVP1 | PW1 | Surfactant | PVA |
|  | Average thickness (μm) | 500 | 500 | 500 | 500 | 500 |
| Compression rubber layer | Rubber composition | A | A | B | A | A |
| Belt performance — Noise suppression | Water injection noise resistance test Noise time measurement (min) |  |  |  |  |  |
|  | Before running | 60 or more | 60 or more | 60 or more | 60 or more | 60 or more |
|  | After running for 300 hours | 60 or more | 60 or more | 60 or more | 47 | 55 |
| Transmission performance | Transmission power (kW) when submerged | 3.150 | 3.148 | 3.145 | 3.140 | 3.121 |
| Transmission efficiency | Torque loss (N·m) | 0.316 | 0.322 | 0.315 | 0.331 | 0.318 |
| Durability | Durability running test for 600 hours (lifetime) | running completion | running completion | running completion | running completion | 330 hr crack |

TABLE 6

|  |  |  | Comp. Example 8 |
|---|---|---|---|
| Surface layer |  | Polyvinyl pyrrolidone 1 | 25 |
|  |  | Polypropylene | 75 |
|  |  | Average thickness (μm) | 50 |
| Compression rubber layer |  | Rubber composition | A |
| Belt performance — Noise suppression | Noise limit angle (°) |  |  |
|  | Sample before running for 200 hours | When dry | 3.0 or more |
|  |  | When submerged | 3.0 or more |
|  | Sample after running for 200 hours | When submerged | 3.0 or more |
| Transmission performance | Transmission power (kW) when submerged |  | 1.344 |
| Transmission efficiency | Torque loss (N·m) |  | 0.248 |
| Durability | Durability running test for 600 hours (lifetime) |  | 280 hr slip |

As shown in Table 4, examples in which polyvinyl pyrrolidone (PVP) was used as a noise suppression improver were Examples 1 to 9. As is clear from Tables 1 and 4, as the physical properties of the rubber composition alone, all of the grip force (magnitude of the friction coefficient), the μ-V characteristic (the change of p accompanying the increase of the slip speed), the internal heat generation, and the elastic characteristic were excellent, and as a result, as the belt performance, a high level could be secured in all of the noise suppression, the transmission performance, the transmission efficiency (torque loss), and the durability life (crack resistance) when submerged.

Specifically, with respect to the rubber composition for a surface layer, the same results as in Example 1 were obtained in Examples 2 and 3 in which a rubber composition C (Example 2) using polyvinyl pyrrolidone 2 having a K value of 88.0 to %.0 and a rubber composition D (Example 3) using polyvinyl pyrrolidone 3 having a K value of 22.5 to 27.0 were used as the rubber compositions in which the type of the PVP-based resin was changed, with respect to a rubber composition B (Example 1) containing polyvinyl pyrrolidone 1 (K value of 27.0 to 33.0).

In addition, the following tendencies were observed, in changing the proportion of PVP from 1 part by mass to 25 parts by mass with respect to the rubber composition B (Example 1), for a rubber composition E (1 part by mass; Example 4) in which the proportion of PVP was reduced, a rubber composition F (7 parts by mass; Example 5), a rubber composition G (10 parts by mass; Example 6), a rubber composition H (15 parts by mass; Example 7), a rubber composition I (20 parts by mass: Example 8), and a rubber composition J (25 parts by mass; Example 9) in which the proportion of PVP was increased with respect to a rubber composition B (5 parts by mass; Example 1).

In Example 1 (5 parts by mass), as the effect of the noise suppression improver (PVP), the balance of the grip force (magnitude of a friction coefficient), the μ-V characteristic (change of p accompanying the increase of the slip speed), the internal heat generation, and the elastic characteristic were excellent, and as a result, as the belt performance, a high level could be secured in all of the noise suppression, the transmission performance, the transmission efficiency (torque loss), and the durability life (crack resistance) when submerged. On the other hand, in Example 4 (1 part by mass) in which the amount of PVP was reduced, the balance of the respective characteristics were excellent as in Example 1.

In Example 5 (7 parts by mass), Example 6 (10 parts by mass), Example 7 (15 parts by mass), Example 8 (20 parts by mass), and Example 9 (25 parts by mass) in which the amount of PVP was increased with respect to Example 1 (5 parts by mass), the internal heat generation tended to increase as the proportion of PVP is increased, but the balance of respective characteristics was excellent as in Example 1. Since the change between Example 8 (20 parts by mass) and Example 9 (25 parts by mass) is small, the effect of PVP is saturated at 20 parts by mass (it can be said that the economic efficiency is lowered even when the PVP is added more than 20 parts by mass). From the above results, it has been found that the proportion of PVP is preferably 1 to 20 parts by mass from the viewpoint of balance of the respective characteristics and economic efficiency.

As compared with configurations of Examples 1 to 9, in Comparative Example 1 in which the surface layer was not formed, the noise suppression as the belt performance was inferior.

As compared with Examples 1 to 9, in Comparative Examples 2 to 3 in which a surfactant was added as the noise suppression improver, the transmission performance and the transmission efficiency (torque loss) when submerged were inferior.

As compared with the configurations of Examples 1 to 9, in Comparative Example 4 in which polyvinyl alcohol particles were added as the noise suppression improver, cracks occurred in the rubber layer of the belt in the durability running test.

In Table 5, the belt including the knitted fabric in the surface layer was evaluated, and as compared with the test in Table 4, the noise suppression when submerged was evaluated by a test under more severe conditions. In Examples 10 to 16 in which PVP was contained in the rubber composition for a surface layer, the type or proportion of PVP was changed as the rubber composition for a surface layer containing a knitted fabric. In either case, no abnormal noise was occurred not only in the belt before running but also in the belt after running for 300 hours. By using PVP, it can be said that the effect on the water injection noise at a high level can be maintained over a long period of time.

In Example 17, the compression rubber layer also contains PVP, and the results were equivalent to those of Example 15. As a result, it has been found that even when the compression rubber layer contains PVP, a small amount of PVP does not affect the physical properties of the compression rubber layer, but considering economic efficiency, it can be said that the technical significance of blending PVP in the compression rubber layer is small.

On the other hand, in Comparative Example 5 in which PVP was not contained in the surface layer, abnormal noise was not occurred during the water injection test for 60 minutes in the belt before running, but abnormal noise was occurred in 45 minutes in the belt after running. In Comparative Example 6 in which a surfactant was used as the noise suppression improver and Comparative Example 7 in which polyvinyl alcohol (PVA) was used as the noise suppression improver, abnormal noise was not occurred in the belt before running, but abnormal noise was occurred in a short time in the belt after running.

From the results in Table 5, there was no significant difference in the transmission performance (transmission power when submerged) and the transmission efficiency (torque loss) among Examples 10 to 16 and Comparative Examples 5 to 7, which are the belts including the knitted fabric in the surface layer, except that the torque loss was large in Comparative Example 6 (surfactant). However, as compared with a belt having no knitted fabric in the surface layer, the belt including the knitted fabric in the surface layer had a tendency that the transmission performance (transmission power when submerged) was increased and the transmission efficiency was decreased (torque loss was increased) as a characteristic peculiar to the knitted fabric coated belt.

In consideration of the results shown in Tables 4 and 5, it can be said that the belt containing the knitted fabric in the surface layer is more suitable for an application in which the noise suppression is emphasized, and a belt not containing the knitted fabric in the surface layer is more suitable for an application in which fuel saving performance (torque loss reduction) is emphasized.

Comparative Example 8 shown in Table 6 is an example corresponding to the embodiment in Patent Literature 3 [using a binder resin (polypropylene) instead of an elastomer]. In Comparative Example 8, the grip properties were inferior to those of Examples 1 to 9 in which PVP was contained in the rubber composition for a surface layer, so that slip easily occurred during running, the transmission performance (transmission power when submerged) is decreased, and the life reached an early stage (280 hours) due to the influence of slip even during 600 hours durability running. It has been clarified that a form in which PVP is contained in the rubber composition for a surface layer is superior in grip property to a form in which PVP is fixed with a binder resin, and thus is superior in terms of the transmission performance and the durability.

Although the present invention has been described in detail with reference to a specific embodiment, it is obvious to those skilled in the art that various changes and modifications may be made without departing from the gist and the scope of the invention.

This application is based on Japanese Patent Application 2019-174610 filed on Sep. 25, 2019, and Japanese Patent Application 2020-154074 filed on Sep. 14, 2020, contents of which are incorporated by reference herein.

INDUSTRIAL APPLICABILITY

The frictional power transmission belt of the present invention can be preferably used as, for example, a flat belt, or a frictional power transmission belt such as a wrapped V-belt, a raw edge V-belt, a raw edge cogged V-belt, or a V-ribbed belt.

REFERENCE SIGNS LIST

1 V-ribbed Belt
2 Tension Layer
3 Adhesive Rubber Layer
4 Tension member
5 Compression Rubber Layer
6 Surface Layer

The invention claimed is:

1. A frictional power transmission belt comprising:
a compression rubber layer that comprises a frictional power transmission surface at least a part of which can come into contact with a pulley and that is formed of a cured product of a rubber composition, and
a surface layer comprising a cured product of a rubber composition comprising a polyvinyl pyrrolidone-based resin and an elastomer component, wherein the surface layer is laminated on a surface of the frictional power transmission surface of the compression rubber layer and is configured to come into contact with the pulley.

2. The frictional power transmission belt according to claim 1, wherein the surface layer further comprises a fabric.

3. The frictional power transmission belt according to claim 1, wherein the elastomer component comprises an ethylene-α-olefin elastomer.

4. The frictional power transmission belt according to claim 1, wherein the polyvinyl pyrrolidone-based resin has a K value of 10 to 100.

5. The frictional power transmission belt according to claim 1, wherein a proportion of the polyvinyl pyrrolidone-based resin is 1 to 20 parts by mass with respect to 100 parts by mass of the elastomer component.

6. The frictional power transmission belt according to claim 1, wherein the rubber composition for forming the surface layer does not comprise a binder resin.

7. The frictional power transmission belt according to claim 1, wherein the rubber composition for forming the compression rubber layer does not comprise a polyvinyl pyrrolidone-based resin.

8. The frictional power transmission belt according to claim 1, wherein the frictional power transmission belt is a V-ribbed belt or a raw edge V-belt, and
wherein the compression rubber layer includes one or more grooves.

* * * * *